United States Patent
Buyya et al.

(10) Patent No.: US 8,230,070 B2
(45) Date of Patent: Jul. 24, 2012

(54) SYSTEM AND METHOD FOR GRID AND CLOUD COMPUTING

(75) Inventors: Rajkumar Buyya, Clarinda (AU); Srikumar Venugopal, North Melbourne (AU); Xingchen Chu, Point Cook (AU); Krishna Nadiminti, Armadale (AU)

(73) Assignee: Manjrasoft Pty. Ltd., Melbourne, Victoria (AU)

( * ) Notice: Subject to any disclaimer, the term of this patent is extended or adjusted under 35 U.S.C. 154(b) by 153 days.

(21) Appl. No.: 12/742,035

(22) PCT Filed: Nov. 7, 2008

(86) PCT No.: PCT/AU2008/001659
§ 371 (c)(1), (2), (4) Date: May 7, 2010

(87) PCT Pub. No.: WO2009/059377
PCT Pub. Date: May 14, 2009

(65) Prior Publication Data
US 2010/0281166 A1    Nov. 4, 2010

(30) Foreign Application Priority Data
Nov. 9, 2007  (AU) ................................. 2007906168

(51) Int. Cl.
*G06F 15/173* (2006.01)
(52) U.S. Cl. ........................................ 709/226; 709/201
(58) Field of Classification Search .................. 709/201, 709/226
See application file for complete search history.

(56) References Cited

U.S. PATENT DOCUMENTS

| 6,418,462 | B1 | 7/2002 | Xu | |
|---|---|---|---|---|
| 8,032,635 | B2* | 10/2011 | Moore | 709/226 |
| 2005/0138175 | A1* | 6/2005 | Kumar et al. | 709/226 |
| 2006/0031509 | A1* | 2/2006 | Ballette et al. | 709/226 |
| 2006/0165040 | A1 | 7/2006 | Rathod et al. | |
| 2007/0088828 | A1* | 4/2007 | Inampudi et al. | 709/226 |
| 2007/0112574 | A1* | 5/2007 | Greene | 705/1 |
| 2007/0180451 | A1 | 8/2007 | Ryan et al. | |
| 2007/0277152 | A1 | 11/2007 | Srinivasan | |
| 2008/0216064 | A1 | 9/2008 | Braswell | |

FOREIGN PATENT DOCUMENTS

| WO | WO2006059343 A2 | 6/2006 |
|---|---|---|
| WO | WO2007040510 A2 | 4/2007 |
| WO | WO2007078300 A2 | 7/2007 |

* cited by examiner

*Primary Examiner* — Brian P Whipple
(74) *Attorney, Agent, or Firm* — Rahman LLC

(57) ABSTRACT

A system and method for providing grid computing on a network of computing nodes, which includes a configurable service container executable at the nodes, including message dispatching, communication, network membership and persistence modules, and adapted to host pluggable service modules. When executed at the nodes, at least one instance of the container includes a membership service module for maintaining network connectivity between the nodes, at least one instance of the container includes a scheduler service module configured to receive one or more tasks from a client and schedule the tasks on at least one of the nodes, and at least one instance of the container includes an executor service module for receiving one or more tasks from the scheduler service module, executing the tasks so received and returning at least one result to the scheduler service module.

32 Claims, 17 Drawing Sheets

Ratio of deadline to maximum execution time (r)

SYSTEM AND METHOD FOR GRID AND CLOUD COMPUTING

RELATED APPLICATION

This application is based on and claims the benefit of the filing date of PCT Application No. PCT/AU2008/001659 filed Nov. 7, 2008, which claims priority to Australian (AU) application no. 2007906168 filed 9 Nov. 2007, the contents of which as filed are incorporated herein by reference in their entireties.

FIELD OF THE INVENTION

The present invention relates to a software platform and system for grid computing (such as at the enterprise level), of particular but by no means exclusive application in business and science.

BACKGROUND OF THE INVENTION

Within this application several publications are referenced by Arabic numerals within brackets. Full citations for these, and other, publications may be found at the end of the specification immediately preceding the claims. The disclosures of all these publications in their entireties are hereby expressly incorporated by reference into the present application for the purposes of further description of the embodiments herein including the background.

Grid computing systems harness distributed resources such as computers, storage devices, databases and sensors connected over a network (such as the Internet) to accelerate application performance. Within an enterprise, grids allow an organisation to improve the utilization of its IT resources, by allowing the use of otherwise unused capacity of IT systems includes personal computers (PCs) for computational tasks without affecting productivity of their normal users. There are, however, a number of difficulties in realising such systems, including resource management, failure management, reliability, application programming and composition, scheduling and security [1].

A number of systems of this kind have been proposed, including the @Home projects (SETI@Home [2] and Folding@Home [3]), Condor [4], Entropia [1], XtremeWeb [5], Alchemi [6] and SZTAKI Desktop Grid [7] (trade marks). The approach adopted by SETI@Home and like systems is to dispatch workloads—comprising data requiring analysis—from a central server to many, and potentially millions, of clients running on PCs around the world, specifically—in the case of SETI@Home—for processing astronomical data. These and similar projects are considered the "first generation" of desktop grids [9]. The infrastructure underlying SET@Home was generalized to create the Berkeley Open Infrastructure for Internet Computing (BOINC) [8]. BOINC allows desktop clients to select the project to which they wish to donate idle computing power, and is used by scientific distributed computing projects, such as climateprediction.net [14] and SZTAKI Desktop Grid [7].

Entropia [1] and United Devices [10] create a Windows (trade mark) desktop grid environment in which a central job manager is responsible for decomposing jobs and distributing them to the desktop clients. XtremWeb [5] also provides a centralized architecture, consisting of three entities (viz. coordinator, worker and clients) to create a XtremWeb network. Clients submit tasks to the coordinator, along with binaries and optional parameter files, and retrieve the results for the end user. The workers are the software components that actually execute and compute the tasks. Alchemi [6] comprises a framework based on Microsoft .NET (trade mark), and also follows a master-slave architecture consisting of managers and executors; the managers can either connect to the executors or other managers to create a hierarchical network structure. The executors can run in either a dedicated or a non-dedicated mode. Alchemi provides an object-oriented threading API and file-based grid job model to create grid applications over various desktop PCs. However, Alchemi is limited to a master-slave architecture, and lacked the flexibility for efficiently implementing other parallel programming models, such as message-passing and dataflow.

Entropia [1], United Devices [10], XtremWeb [5] and Alchemi [6] can be categorized as second generation desktop grids. They are built with a rigid architecture with little or no modularity and extensibility. Their components, such as job scheduler, data management and communication protocols, are built for a specific distributed programming model. These generally follow a master-slave model wherein the "slaves" (the execution nodes) communicate with a central master node. The major problems with this approach are latency and performance bottlenecks, a single point of vulnerability in the system, and high cost of the centralised server. In addition, this approach lacks the capabilities required for advanced applications that involve complex dependencies between parallel execution units, and the flexibility required for implementing various types of widely-employed parallel and distributed computing models such as message-passing and dataflow.

More recently, the Web Services Resource Framework (WSRF) [15] has been adopted by some as a standard. In WSRF, the different functionalities offered by a grid resource are made available through loosely-coupled, stateful service instances hosted in a Web-enabled container that provides a basic infrastructure.

SUMMARY OF THE INVENTION

In a first broad aspect, the invention provides a software platform for providing grid computing on a network of computing nodes in mutual data communication, comprising:
  a configurable service container executable at the nodes, the container comprising message dispatching, communication, network membership and persistence modules, and being adapted to host pluggable service modules;
  wherein when executed at the nodes at least one instance of the container includes a membership service module for maintaining network connectivity between the nodes, at least one instance of the container includes a scheduler service module configured to receive one or more tasks (directly or indirectly) from a client and schedule the tasks on at least one of the nodes, and at least one instance of the container includes an executor service module for receiving one or more tasks from the scheduler service module, executing the tasks so received and returning at least one result to the scheduler service module.

In some embodiments, the service modules are adapted to support a selected parallel programming model (such as a message-passing or a dataflow model) or a selected distributed programming model (such as a master-slave model), or a programming model that can provide both parallel and distributed processing.

Indeed, in some embodiments, the service modules are adapted to support a plurality of programming models, whether parallel, distributed, both parallel and distributed, or a mixture of two or more of these.

Thus, the container allows the realisation of a variety of parallel and distributed programming models using the same infrastructure on the same network of nodes by the use of pluggable service modules tailored to specific models.

In certain embodiments, the container includes security and logging modules.

In one embodiment, at least one instance of the container includes more than one of the membership service module, the scheduler module and the executor module.

In certain embodiments, when executed at the nodes a plurality of instances of the container include an executor module for executing tasks.

Each node generally comprises a computing device, such as a personal computer, but a single computing device may comprise multiple nodes, such as where the computing device has multiple processors or multiple processor cores. Thus, in one embodiment, a plurality of the computing nodes are executed on respective processor cores of a single processor.

In one embodiment, services provided by the modules and the container are mutually independent.

Thus, the capabilities required for different services are separated from the message dispatching module, so that the platform is able to support different configurations as required.

In a second broad aspect, the invention provides a grid of computing nodes in mutual data communication, each of the nodes comprising:

a configurable service container executed at the respective node, including message dispatching, communication, network membership and persistence modules, and adapted to host pluggable service modules;

wherein at least one of the containers includes a membership service module for maintaining network connectivity between the nodes, at least one of the containers includes a scheduler service module configured to receive one or more tasks from a client and schedule the tasks on at least one of the nodes, and at least one of the containers includes an executor service module for receiving one or more tasks from the scheduler service module, executing the tasks so received and returning at least one result to the scheduler service module.

Each node generally comprises a computing device, such as a personal computer, but a single computing device may comprise multiple nodes, such as where the computing device has multiple processors or multiple processor cores.

In some embodiments, the method includes adapting the service modules to support a selected programming model (which may be parallel, distributed or both), and executing the selected programming model. In other embodiments, the method includes adapting the service modules to support a plurality of programming models and executing the programming models.

In a third broad aspect, the invention provides a grid computing method for providing grid computing on a network of computing nodes in mutual data communication, comprising:

executing a configurable service container at the nodes, the container comprising message dispatching, communication, network membership and persistence modules, and being adapted to host pluggable service modules;

maintaining network connectivity between the nodes with a membership service module of at least one instance of the container;

receiving one or more tasks from a client and scheduling the tasks on at least one of the nodes with a scheduler service module of at least one instance of the container; and receiving one or more tasks from the scheduler service module, executing the tasks so received and returning at least one result to the scheduler service module with an executor service module of at least one instance of the container.

The method may include adapting the service modules to support a selected programming model, and executing the selected programming model.

The method may include adapting the service modules to support a plurality of programming models and executing the programming models.

The method may include adapting the service modules to support at least one parallel programming model and at least one distributed programming model.

In one embodiment, a plurality of the computing nodes comprise respective processor cores of a single processor.

The method may comprise checking availability of a computation resource on the nodes with an allocation manager service in response to a negotiation (conducted, for example, via a negotiation web service) for the computation resource and reserving the computation resource with the allocation manager service if the negotiation succeeds.

The method may comprise providing a MapReduce programming model, such as adapted for a .NET platform.

In a fourth broad aspect, the invention provides a grid computing method for performing grid computing on a network of computing nodes in mutual data communication, comprising:

executing on each of the nodes a configurable service container executed at the respective node, including message dispatching, communication, network membership and persistence modules, and adapted to host pluggable service modules;

wherein at least one of the containers includes a membership service module for maintaining network connectivity between the nodes, at least one of the containers includes a scheduler service module configured to receive one or more tasks from a client and schedule the tasks on at least one of the nodes, and at least one of the containers includes an executor service module for receiving one or more tasks from the scheduler service module, executing the tasks so received and returning at least one result to the scheduler service module.

In another broad aspect, the invention provides a runtime MapReduce system deployed in an enterprise grid environment with the software platform described above.

In another broad aspect, the invention provides a parameter sweep programming model supported by the software platform described above.

In another broad aspect, the invention provides a design explorer operable to design an application, create an application template corresponding to the application, and submit the application to the software platform described above, wherein the template is adapted to be parsable by a client manager of the platform and to prompt the client manager to generate one or more grid tasks for execution within the software platform.

BRIEF DESCRIPTION OF THE DRAWING

In order that the invention may be more clearly ascertained, embodiments will now be described, by way of example, with reference to the accompanying drawing, in which.

DETAILED DESCRIPTION

Figure 1:
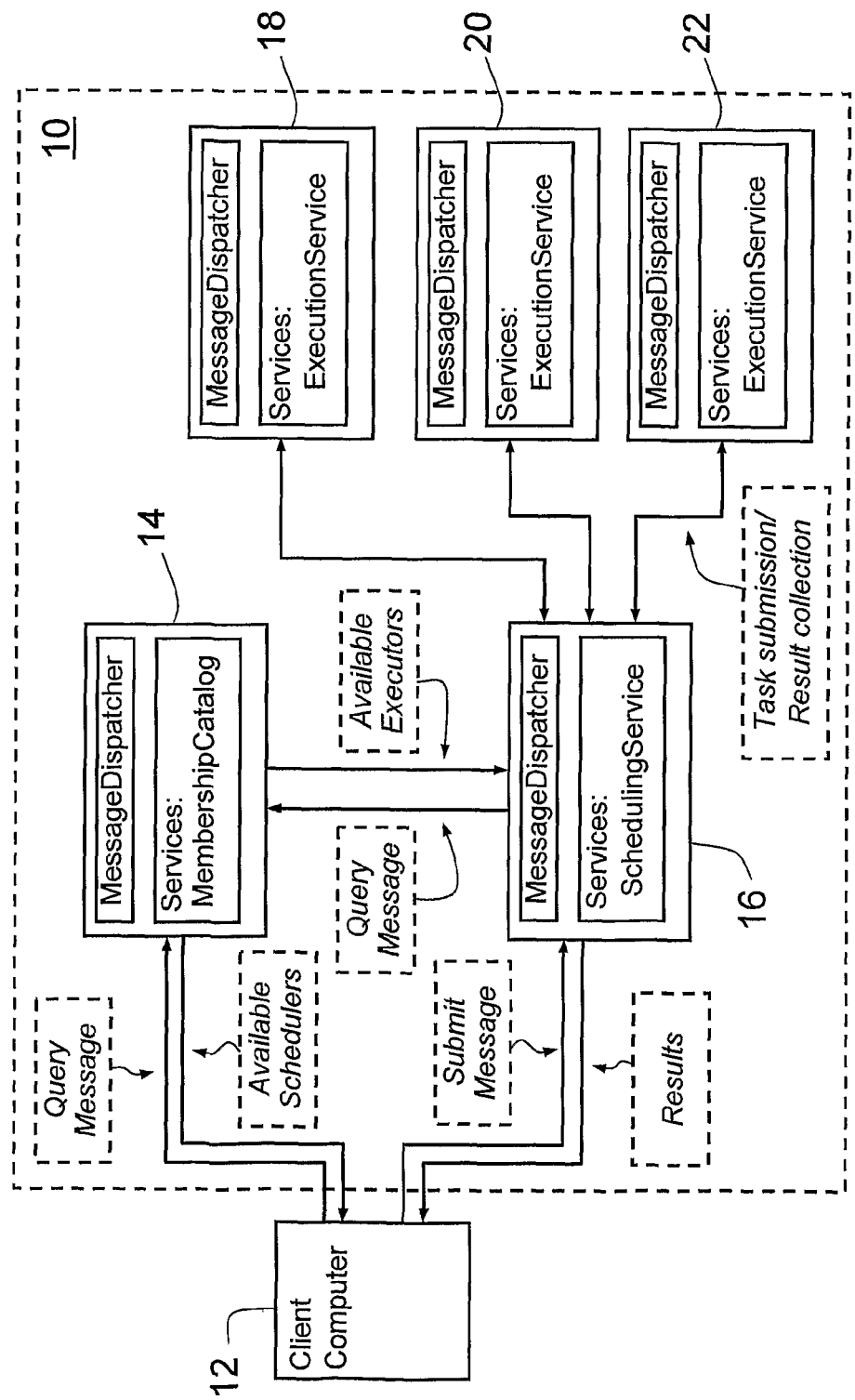
FIG. 1 is a schematic view of a lightweight, service-oriented, enterprise grid computing platform executed in a network, shown with a client computer.

Referring to FIG. 1, according to an embodiment of the present invention, there is provided a lightweight, service-oriented, enterprise grid computing platform executed in a network 10, shown in FIG. 1 with—and in data communication with—a client computer 12. In general terms, network 10 comprises one or more (in the illustrated example, five) nodes, each executing a configurable container that includes message dispatching, communication, network membership, security, logging and persistence modules (for providing the corresponding services) and that hosts a number of pluggable services. The message dispatching module is, in this embodiment, termed 'MessageDispatcher'. Network 10 allows a user to implement various parallel and distributed programming models, as is discussed below.

In the example of FIG. 1, network 10 includes an index node 14, a scheduler node 16, and three executor nodes 18, 20, 22, at which respective instances of the container are executed. Each node corresponds to a computing device, such as a personal computer, though—as will be appreciated by those in the art—a single computing device may correspond to more than one node if it has more than one processor or a processor with more than one core. However, each node corresponds to one instance of the container.

Each container enables pluggable services, persistence solutions, security implementations, and communication protocols, so the platform implemented by network 10 provides a decentralized architecture peering individual nodes. The platform supports various programming models including object-oriented grid threading programming model (fine-grained abstraction), file-based grid task model (coarse-grained abstraction) for grid-enabling legacy applications, and dataflow model for coarse-grained data intensive applications. It supports a variety of authentication/authorisation mechanisms (such as role-based security, X.509 certificates/GSI proxy and Windows domain-based authentication) and of persistence options (such as RDBMS, ODBMS and XML or flat files). The platform also supports a web services interface supporting the task model for interoperability with custom grid middleware (e.g. for creating a global, cross-platform grid environment via a resource broker) and non-.NET programming languages.

FIG. 1 also illustrates the basic sequence of interactions between the instances of the container at the various nodes of network 10. Firstly, a client program running on client computer 12, having a set of computing tasks to be performed, searches for available nodes where the appropriate scheduling service is deployed, with a Membership Catalogue hosted by the container at index node 14. It does this by sending a Query Message to index node 14 and, in due course, receives a response indicating the available schedulers. The client program submits its tasks—in a Submit Message—to any of the discovered schedulers, in this example to a scheduling service hosted by the container at scheduler node 16, along with its credentials. The scheduling service authenticates the client's request, and discovers appropriate executors (i.e. the execution services at one or more of executor nodes 18, 20, 22) for executing the client's program, by sending an appropriate Query Message to using index node 14 and receiving a response indicating the available, appropriate executors.

The scheduling service then dispatches the tasks to the available, appropriate executor nodes 18, 20, 22 where they are executed, which execute the tasks and return the results to scheduler node 16. A service on the scheduler node 16 monitors the executions, collects the results and sends them to client computer 12 once the executions are completed. The messages exchanged between client computer 12, scheduler node(s) 16 and executor node(s) 18, 20, 22 contain information about the security token, source and destination URLs, the name of the service that actually handles the message, and any required application data. The services neither communicate with each other nor exchange the messages between themselves directly; rather, all messages are dispatched and handled through the MessageDispatcher deployed in each container.

Figure 2A:
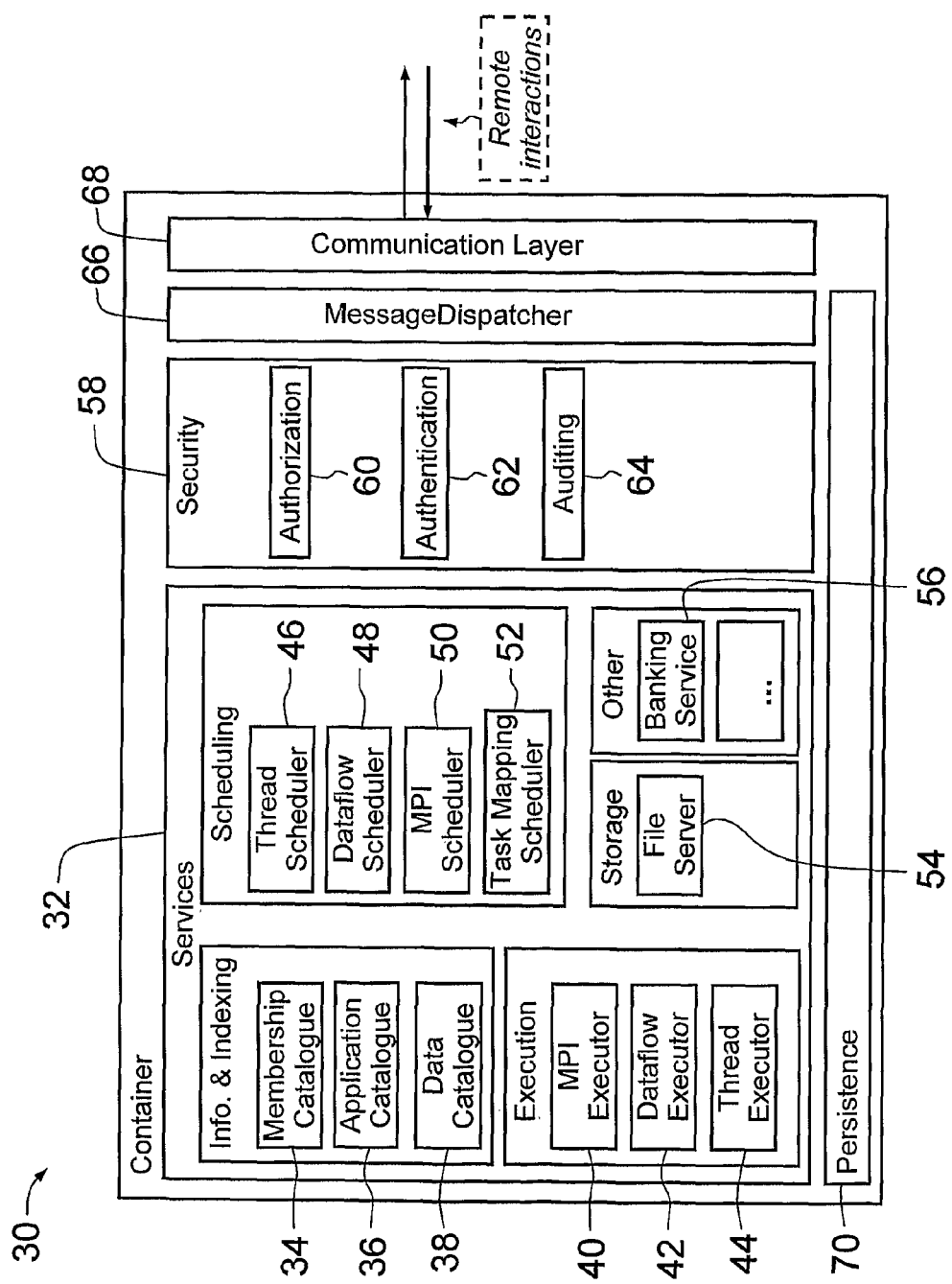
FIG. 2A is a more detailed schematic view of an instance of the configurable container of the grid computing platform of FIG. 1.

The grid computing platform of this embodiment provides a highly modular architecture, as shown in FIG. 2A, a more detailed schematic view of an instance 30 of the configurable container, as deployed—for example—at a node of network 10. Container 30 is shown with various services (termed 'compulsory') that are provided by the modules discussed above and in this embodiment are always invoked, and various optional services that it can host, though in practice few if any container instances would host all these services at once.

The services that are always invoked and that provide, as mentioned above, functions such as security, persistence and communication protocols, are termed the base infrastructure. The optional services include specific executors for different types of programming models and/or associated schedulers.

Thus, container 30 includes optional services 32 including the information and indexing services: Membership Catalogue 34, Application Catalogue 36 and Data Catalogue 38, execution services including MPI (Message Passing Interface) Executor 40, Dataflow Executor 42 and Thread Executor 44, scheduling services including Thread Scheduler 46, Dataflow Scheduler 48, MPI Scheduler 50 and Task Mapping Scheduler 52, storage services including File Server 54 and other services, typically tailored to the discipline in which network 10 is deployed, such as Banking Service 56.

Figure 2B:
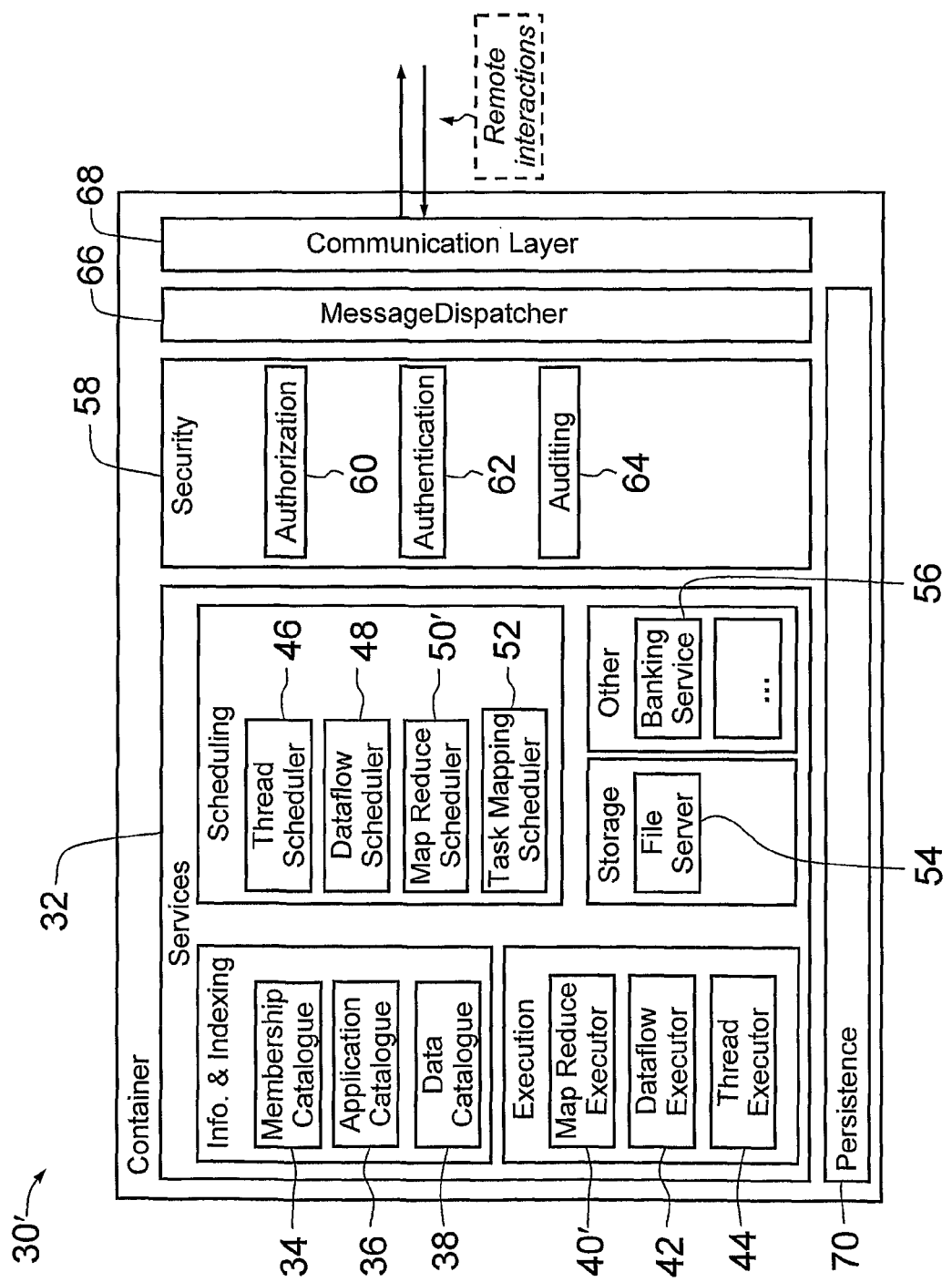
FIG. 2B is a schematic view comparable to FIG. 2A, showing a variant of the instance of the configurable container shown in FIG. 2A.

In one variant of this embodiment (shown schematically at 30' in FIG. 2B), the execution services include a Map Reduce Executor 40' instead of MPI Executor 40 and the scheduling services a Map Reduce Scheduler 50' instead of MPI Scheduler 50. In still another variant (not illustrated), the execution services include both MPI Executor 40 and Map Reduce Executor 40', and the scheduling services include both MPI Scheduler 50 and Map Reduce Scheduler 50'.

'Compulsory' services comprise those provided by security module 58 (including Authorization service 60, Authentication service 62 and Auditing service 64), those provided by MessageDispatcher 66 (including message handling and dispatching), Communication Layer module 68 (for handling remote interactions), and persistence module 70.

Container 30 is a runtime host and coordinator for other components. Container 30 uses Inverse of Control (IoC) [13] to inject dependencies at runtime. Details of compulsory and optional services, security, persistence, and associated communication protocols are specified in an XML configuration file that is stored on the corresponding node and read by container 30 when it is initialized. The principal function of container 30 is to initialize the services and present itself as a single point for communication to the rest of network 10. However, to improve the reliability and flexibility of network 10, neither container 30 nor the hosted services are dependent on each other. This is so that a malfunctioning service will not affect the others services or the container. Also, this enables the administrator of network 10 to readily configure and manage existing services or introduce new ones into a container.

The base infrastructure for the runtime framework provides message dispatching, security, communication, logging, network membership, and persistence functions that are then used by the hosted services. However, it is possible to substitute different implementations of these functions according to the requirements of the services. For example, users can choose either a light-weight security mechanism, such as role-based or a certificate-based security (such as on X.509 certificates) by modifying the configuration file, and the runtime system will automatically inject them on-demand by the services. In a similar manner, network 10 can support different persistence mechanisms, such as memory, file or database backends. The MessageDispatchers 66—acting as front controllers—enable node to node service communication. Every request from client computer 12 or other nodes to the container is treated as a message, and is identified and dispatched through the instant container's MessageDispatcher 66. The communication mechanism used by the MessageDispatcher 66 can also be configured to use socket, .NET remoting or web services.

The services provide the core functionality of network 10, while the infrastructural concerns are handled by the runtime framework. This model is similar to a web-server or application-server, where the user hosts custom services/modules that run in a managed container. For enabling a distributed computing environment on top of the container, various services—such as resource information indexes, execution services, scheduling and resource allocation, and storage services—would be necessary. The only service that at least one container must host is the Membership Catalogue, which maintains network connectivity between the nodes. The services themselves are independent of each other in a container and only interact with other services on the network, or the local node through known interfaces.

Figure 3:
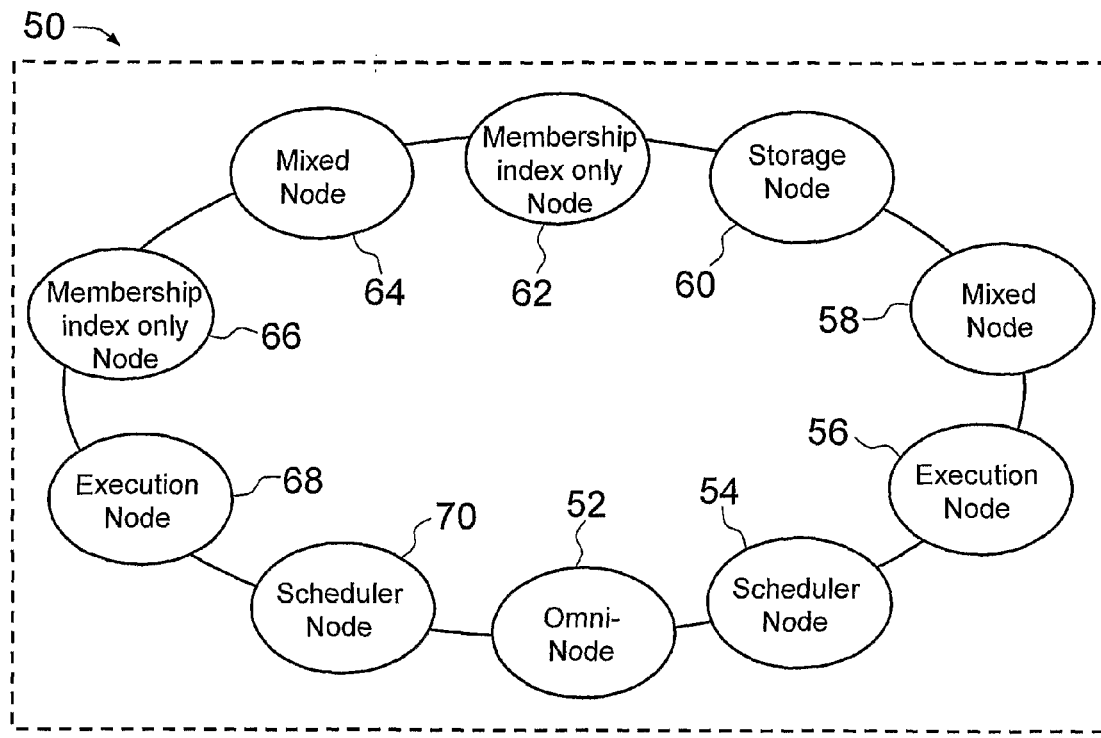
FIG. 3 is a schematic view of a network according to another embodiment of the present invention in which different types of nodes are configured to create a network in which each node works as a peer.

The architecture of network 10 is dependent on the interactions among the services, as each container can directly communicate with any other container reachable on network 10. Each node in network 10 takes on a role depending on the services deployed within its container. For example, a node can be a pure indexing server if only the indexing services (viz. Membership Catalogue 34) are installed in the container; nodes with scheduler services (viz. Thread Scheduler 46, Dataflow Scheduler 48) can be pure scheduler nodes that clients submit their tasks to; nodes with execution services (viz. Dataflow Executor 42, Thread Executor 44) can be solely concerned with completing the required computation. A node can also host multiple services, and be both a scheduler and executor at the same time. This is illustrated in FIG. 3, which is a schematic view of a network 50 according to an embodiment of the present invention where different types of nodes are configured to create a network in which each node works as a peer, so a request from the end user can potentially spread to every node with the appropriate functions. In this example, the nodes are, in sequence, an omni-node 52 (i.e. hosting all services, as in container 30 of FIG. 2A), a scheduler node 54, an execution node 56, a mixed node 58, a storage node 60, a membership index only node 62, another mixed node 64, another membership index only node 66, another execution node 68 and another scheduler node 70. As there is no central manager to manage other executors, requests are filtered by each node, which decide whether to handle or to ignore each request.

The grid computing platform runtime is implemented on network 10 by leveraging the Microsoft brand .NET platform and using the IoC implementation in the Spring .NET framework [11]. This embodiment employs Microsoft .NET owing to its ubiquity on Windows desktop computers and the potential of running the platform of network 10 on Unix-class operating systems through the .NET-compliant Mono platform [12]. The multiple application models are implemented as extended services on top of the runtime framework. Below is explained the implementation of two known distributed programming models on top of the platform, and also how the users configure and deploy a node of network 10.

A task is a single unit of work processed in a node. It is independent from other tasks that may be executed on the same or any other node at the same time. It has only two possible outcomes: it either executes successfully or fails to produce any meaningful result.

The task model involves the following components: the client, the scheduler and the executor. The task object is serialised and submitted by the client (in the embodiment of FIG. 1, on client computer 12) to the scheduler (cf. scheduler node 16). The task scheduler is implemented as a service hosted in an instance of container 30, and continuously listens for messages for requests such as task submission, query, and abort. Once a task submission is received, it is queued in its database. The scheduler thread picks up queued tasks and maps them to available resources (cf. executor nodes 18, 20, 22) based on various parameters including priorities, user quality of service (QoS) requirements, load and so on. These parameters and scheduling policies are pluggable and can be replaced with custom policies. The task scheduler keeps track of the queued and running tasks, and of information about the performance of the task executor nodes it is able to find in the network, by communicating with the membership service.

The task executor is also implemented as a service hosted in a container, and its main role is to listen for task assignments from the scheduler. When the executor receives a task, it unpacks the task object and its dependencies, creates a separate security context for the task to run, and launches the task. This allows the task to run in an application domain separate from the main domain in which the container runs.

The executor supports multi-core and multi-CPU scenarios by accepting as many tasks to run in parallel as there are free CPUs or cores.

Once a task is complete, the respective executor notifies the scheduler and sends the results back to the scheduler. The executor can accept tasks from any scheduler in the network.

In order to enable the interoperability with custom grid middleware and the creation of a global, cross-platform grid environment, network 10 implements a web services interface that provides the task management and monitoring functionalities on top of the task model.

The dataflow programming model abstracts the process of computation as a dataflow graph consisting of vertices and directed edges. The vertex embodies two entities: the data created during the computation or the initial input data if it is the first vertex, and the execution module to generate the corresponding vertex data. The directed edge connects vertices, which indicates the dependency relationship between vertices.

The dataflow programming model consists of two principal components, the scheduler and the worker. The scheduler is responsible for monitoring the status of each worker, dispatching ready tasks to suitable workers (cf. executors) and tracking the progress of each task according to the data dependency graph. The scheduler is implemented as a set of three key services:

1. A registry service, which maintains the location information for available vertex data and in particular maintains a list of indices for each available vertex data;
2. A dataflow graph service, which maintains the data dependency graph for each task, keeps track of the availability of vertices and explores ready tasks; when it finds ready tasks, it notifies the scheduler; and
3. A scheduling service, which dispatches ready tasks to suitable workers for executing; for each task, it notifies workers of inputs, and initiates the associated execution module to generate the output data.

The worker works in a peer to peer fashion. To cooperate with the scheduler (which acts as the master), each worker has two functions: executing upon requests from master and storing the vertex data. Therefore, the worker is implemented as two services:

1. An executor service, which receives execution requests from the scheduler, fetches input from the storage service (see below), stores output to the storage service and notifies the scheduler about the availability of the output data for a vertex.
2. A storage service, which is responsible for managing and holding data generated by executors and providing it upon requests; to handle failures, the storage service can keep data persistently locally or replicate some vertices on remote side to improve the reliability and availability.

To improve the scalability of the system, workers transfer vertex data in a P2P manner between themselves. Whenever the executor service receives an executing request from the master node, it sends a fetch request to the local storage service. If there is one local copy for the requested data, the storage service will fetch the data from a remote worker according to the location specified in the executing request. When all the input data is available on the worker node, the executor service creates an instance for the execution module based on the serialized object from the scheduler, initialises it with the input vertices and starts the execution. After the computation finishes, the executor service saves the result vertex into local storage and notify the registry service. The storage service keeps hot vertex data in memory while holding cold data on the disk. The vertex data is dumped to disk asynchronously to reduce memory space if necessary. The worker schedules the executing and network traffic of multiple tasks as a pipeline to optimize the performance.

Container 30 of the grid computing platform of this embodiment provides a unified environment for configuration and deployment of services. All services are able to use the configuration APIs, which store per-user, per-host settings in a simple XML file for each service. Hence, the settings and preferences for each service are separated from each other, and also allow for customised settings for each user. The deployment of services is a simple operation involving modifying the application configuration file, and adding entries for the new service to be included in the container's service dictionary.

EXAMPLES

Two sets of experiments have been performed: the first examined the performance of a single container, and the second evaluated the task farming capacity of network 10 and dataflow programming models to execute over a distributed system.

1. Performance Results of Single Container

As discussed above, container 30 is the interface to the rest of network 10. That is, container 30 sends and receives all messages on behalf of the services hosted within it. In the following experiments, whether this aspect of network 10 affects the performance and scalability of network 10 was evaluated. In particular, the affect of the number of services, the number of connected clients, and the size and volume of messages on the performance of the container was measured.

The experiments were performed using a single container 30 running on a PC with an Intel Pentium4 3 GHz CPU, 1 GB of RAM and a Windows XP operating system. In the first experiment, the variation in startup time of a container with respect to the number of services that are hosted inside it was measured. This was evaluated with two types of services, that is, stateless and stateful. A stateless service is similar to a Web server where the service does not track the state of the client, whereas a stateful service tracks requests and connects to the database to store the state of the request. A stateful service also runs in a separate thread. The experiment was performed by starting between 1 and 1 000 services of each type, stateless and stateful, and measuring the time required to initialise container 30.

Figure 4:
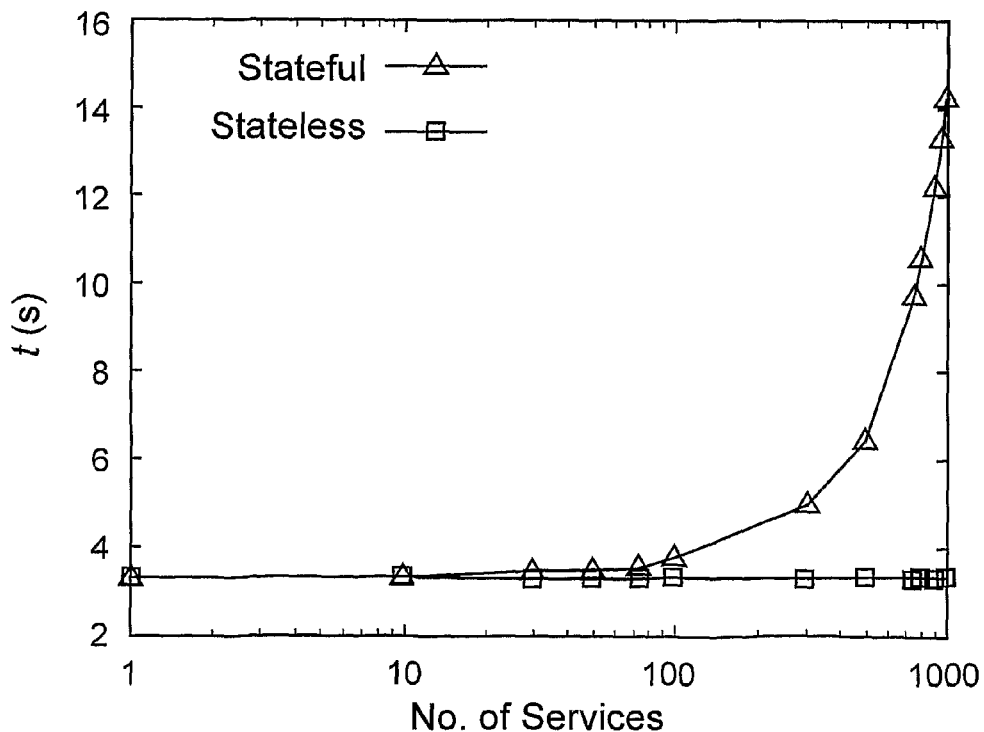
FIG. 4 presents linear-log plots of the results of measurements of the effect of number of services on startup time according to an embodiment of the present invention.

FIG. 4 presents linear-log plots of the results of these experiments, as initialisation time t(s) versus the number of services. Stateless services do not request any resources, so the measured time is that required for starting up the container 30 alone. This initialisation time, as is evident from FIG. 4, is constant for any number of stateless services. However, initialisation time increases exponentially if the services are stateful, which can be attributed to the more resource-intensive nature of these services. The curve for stateful services is uniformly exponential in this experiment, as the same service was started multiple times. However, this will not be generally so, as different stateful services are likely to affect the startup times in different ways by requiring different amounts of resources. It can also be seen that, in this case, the effects of stateful services become significant only when their number exceeds 300.

As discussed above, container 30 is designed as a lightweight hosting mechanism that provides the bare minimum functionality to the hosted services to create a enterprise grid. FIG. 3 shows an expected deployment where a node offers specific functionality enabled by a small number of specialized services that are likely to be stateful. The results of FIG. 4 show that container 30 does not affect start-up performance in such cases.

Figure 5:
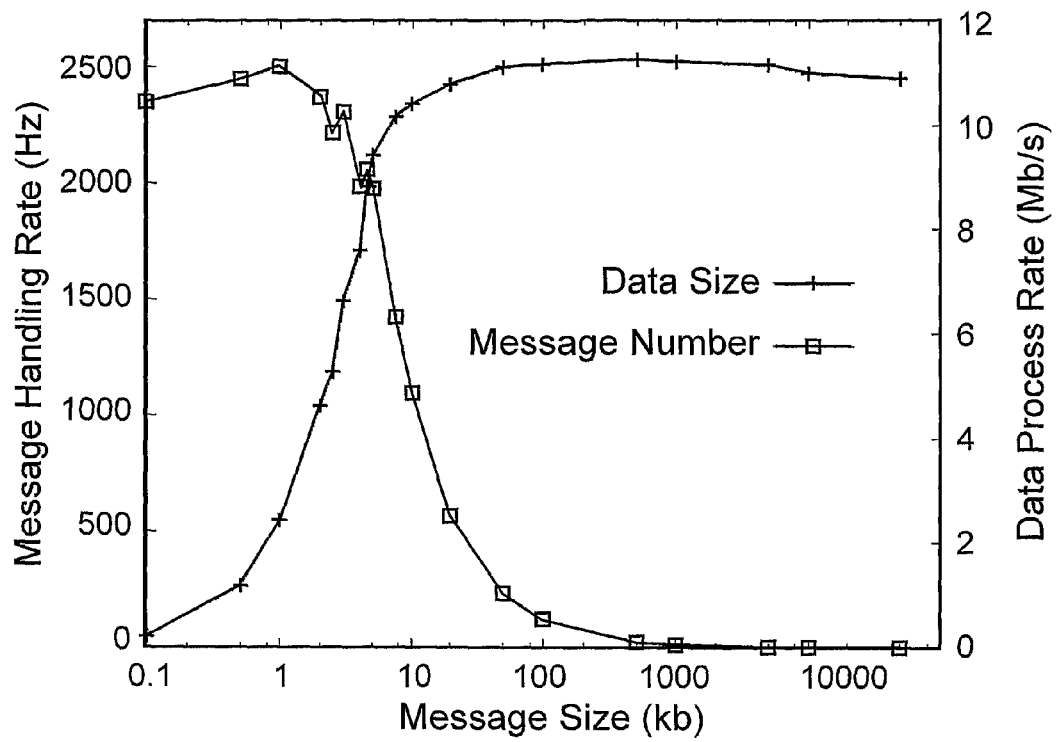
FIG. 5 presents plots of the results of measurements of the effect of message size on throughput according to an embodiment of the present invention.

In the second experiment, the effect of the size and number of messages on the throughput of container 30 was measured. Container 30 was initialized with an echo service with a constant time for processing a single message. Next, 10 000 messages were sent to container 30, the messages having sizes of between 0.1 and 100 000 kb. The aggregate response time was then measured. The results are plotted in FIG. 5 as message handling rate (Hz) and data process rate (Mb/s) as functions of message size (kb). The results are as expected, with the message handling rate decreasing uniformly as the size of the message increases. However, the amount of data processed becomes almost constant above a message size of ~100 kb. This is because of the configuration of the underlying 100 Mbps network to container 30 and is not due to the container itself.

It can be inferred from the results that network 10 is suitable for highly parallel applications such as those following the master-worker model of computation where the communication occurs only at the end of task execution, and for message-passing applications where the message size is less than 100 kb. However, it may not be suitable for Data Grid applications that require constant access to large amounts of data.

The last experiment determined the response time of the container with respect to number of clients connecting to it. This experiment was performed by keeping the total number of received messages constant (at 10 000), while increasing the number of threads sending the messages, thereby emulating simultaneous connections from multiple clients. The results are plotted in FIG. 6 as average response time per message ($t_r$(ms)) against No. of Clients.

Figure 6:
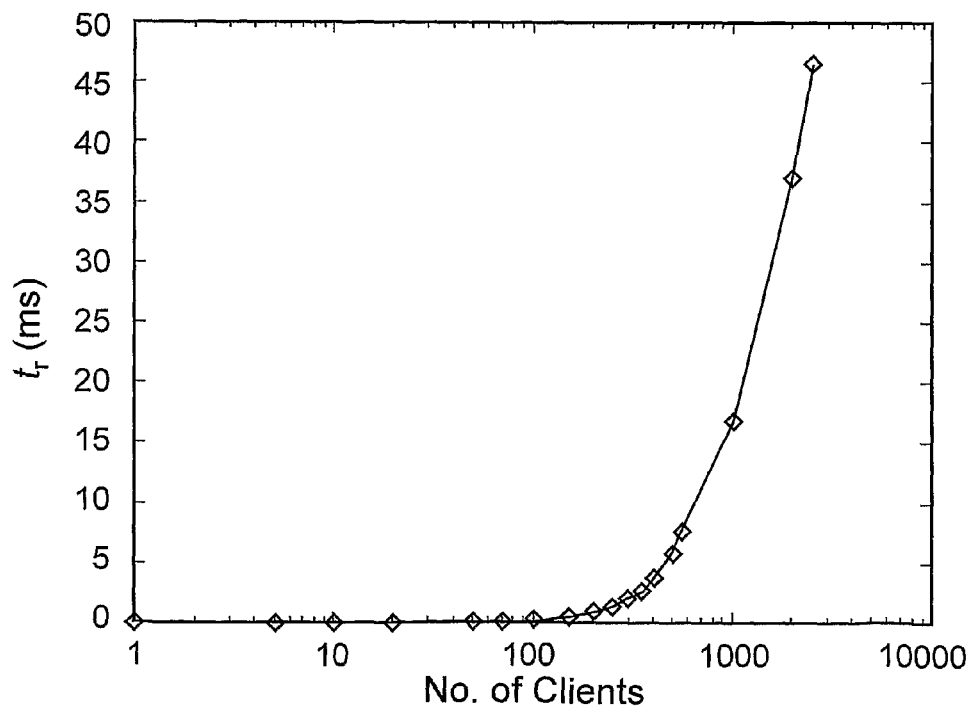
FIG. 6 presents plots of the results of measurements of the effect of number of clients on response time according to an embodiment of the present invention.

It can be seen from FIG. 6 that the average response time per message increases steeply when the number of clients exceed 400. Even so, the response time per message is less than 20 ms for up to 1 000 concurrent clients. In the test regime, every message is synchronised, so it is a blocking call on container 30, and hence performance for large numbers of clients is adversely affected.

2. Case Studies

The versatility of the grid computing platform of this embodiment was demonstrated with case studies involving two distributed applications that were implemented using two different programming models on top of the same infrastructure. The first application predicted the secondary structure of a protein given its sequence, using Support Vector Machines-based classification algorithms [16] and BLAST [17], a program for locating regions of similarity between DNA or the like sequences. This was implemented using the independent task programming model. The second application performed matrix multiplication and was implemented using the dataflow programming model presented in the previous section. These applications were evaluated on a testbed consisting of 32 computers in a single laboratory, each of which was similar to the PC on which container 30 was tested (see above), connected by a 100 Mbps network.

Figure 7:
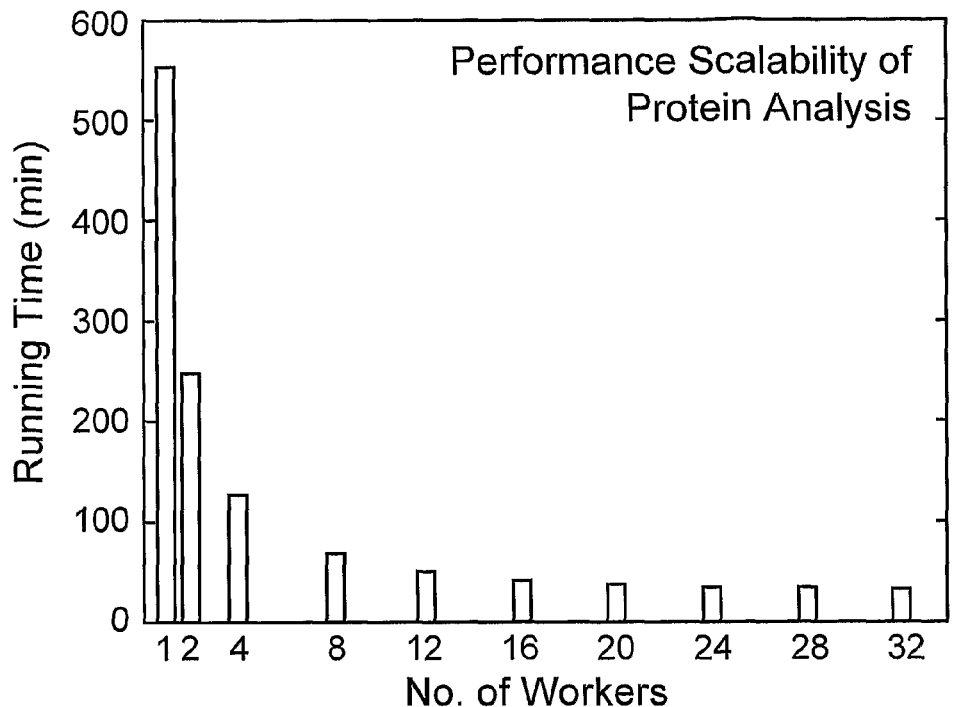
FIG. 7 presents plots of the results of measurements of execution time as a function of the number of nodes in protein sequence analysis according to an embodiment of the present invention.

The structure prediction application was executed as a master-worker application across the testbed. Each executor (or worker) node ran an instance of BLAST [17] for each protein sequence, the results of which are then input to a set of classifiers that attempts to predict the secondary structure. The result of this process is returned to the master process. Each instance of the application accessed a 2.8 GB-sized database which, in this case, was replicated across all the nodes. The evaluation was carried out using 64 protein sequences at a time, with varying number of worker nodes. The results of the experiment are plotted in FIG. 7 as running time (min) versus No. of Workers (cf. executors). The execution time decreases logarithmically until the number of nodes reaches 16 after which there is little if any performance gain with increased parallelization.

The block-based square matrix multiplication experiment was evaluated with two 8000×8000 matrices over a varying number of nodes up to a maximum of 30 nodes. The matrix was partitioned into 256 square blocks where each block was around 977 kb. On the whole, the experiment involved 488 Mb of input data and generated a result of 244 Mb. The results of the experiment are plotted in FIG. 8 as Speedup factor and Network Overhead (taken to be the ratio of the time taken for communication to the time taken for computation) as functions of No. of Workers. There are two main factors that determine the execution time of the matrix multiplication: the distribution of blocks between the workers (viz. executors) and the overhead introduced by the transmission of intermediate results between the executors.

Figure 8:
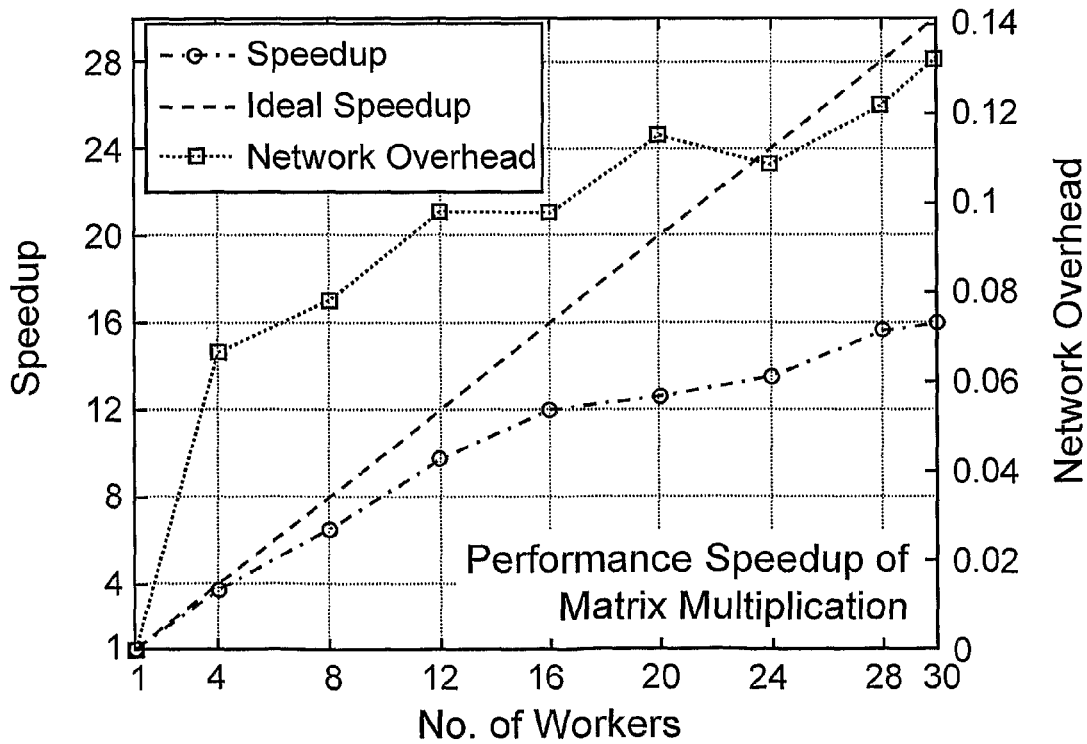
FIG. 8 presents plots of the results of measurements of speedup factor and network overhead as functions of number of workers in matrix multiplication according to an embodiment of the present invention.

As can be seen from FIG. 8, for a large number of executors, while the speedup improves, network overhead is also substantially increased. Speedup begins to diverge significantly from the ideal when the network overhead increases to more than 10% of the execution time.

3. Other Applications i) Service Level Agreement Negotiation and Reservation

According to another embodiment of the present invention there is provided an offer protocol in which a user can negotiate with the enterprise grid computing platform of the above embodiment via a broker to reserve a specific computation node based on the time. According to this embodiment, the platform provides a negotiation web service that defines the methods that a broker needs to invoke. Internally, the platform provides an allocation manager service which is responsible for checking the availability of the computation resource on the nodes and making reservation if the negotiation succeeds. The reservation mechanism guarantees to the enterprise users the use of the computation resources exclusively during a certain period of time. The platform of FIG. 1 with these extended capabilities allow it to support other emerging distributed computing systems and applications, such as cloud computing [66].

In this embodiment, a method is provided for negotiating Service Level Agreements (SLAs) based on Rubinstein's Alternating Offers protocol [29] for bargaining between agents. This method allows either party to modify the proposal or to provide counter proposals so that both can arrive at a mutually-acceptable agreement. Its use is described below as implemented for enabling a resource consumer to reserve nodes on a shared computing resource in advance. The consumer side of the method is implemented in the Gridbus broker [30] and the provider side of the method is implemented within the .NET-based enterprise grid platform described above. The method of this embodiment was evaluated using reservation requests with a range of strict to relaxed requirements.

The method of this embodiment is able to conduct bilateral negotiations in order to gain guaranteed reservations of resources in advance. The resource management system of this embodiment can generate alternative offers to consumers in case their original request cannot be fulfilled. The broker, acting as the resource consumer, has the ability to generate its own counter proposals as well.

The Negotiation Method

Figure 9:
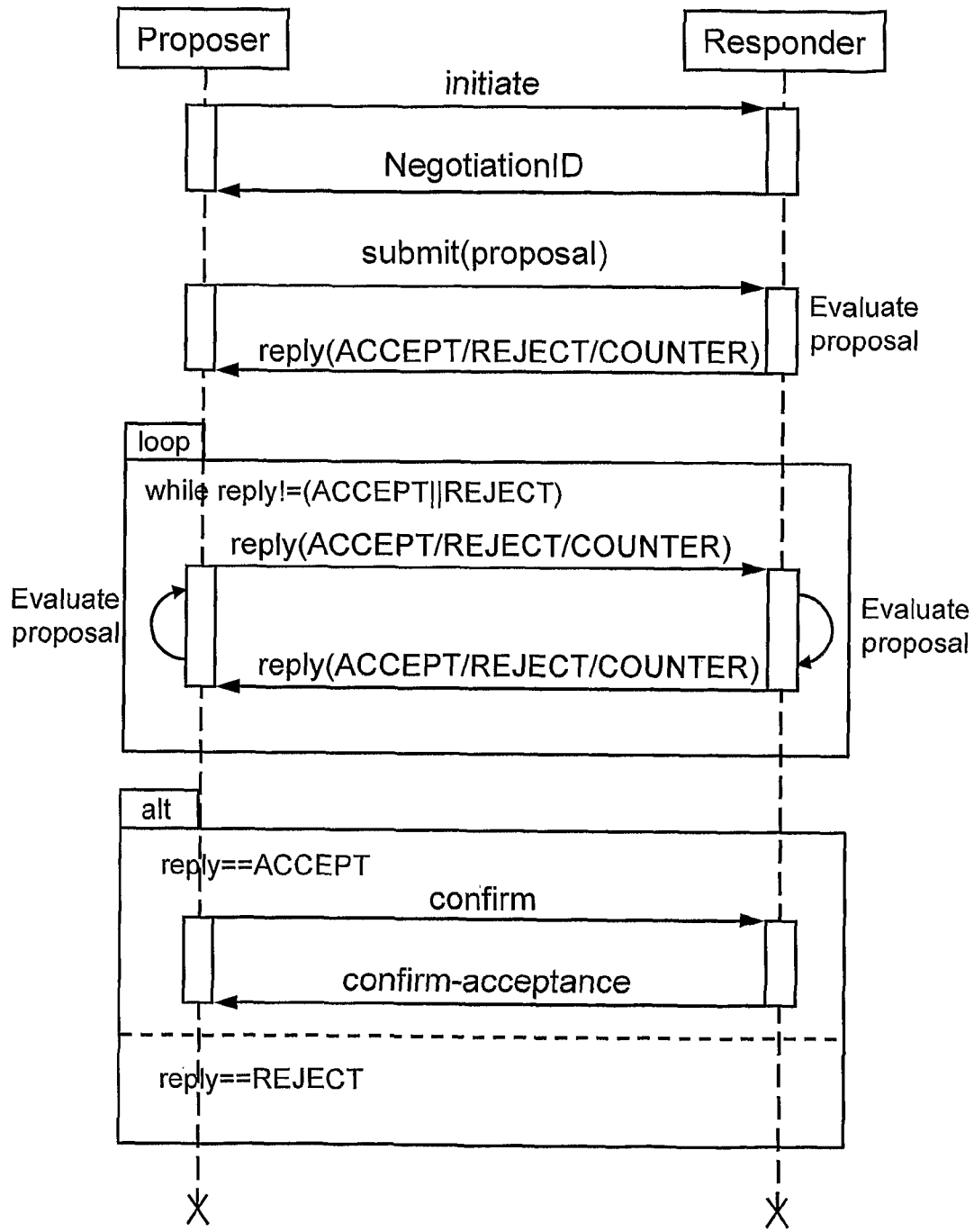
FIG. 9 illustrates schematically the alternating offers-based method for Service Level Agreement (SLA) negotiation according to a further embodiment of the present invention.

FIG. 9 illustrates schematically the alternating offers-based method for SLA negotiation of this embodiment. The method is a bilateral protocol between the proposer who initiates the process and the responder who replies to the proposal. The proposer starts the negotiation process by sending an INITIATE message, to which the responder replies with a unique negotiation identifier (negotiationID). The initiate call may be accompanied by an exchange of credentials so that both parties are able to verify each other's identity. The proposer then presents a proposal using the submitProposal message. The responder can accept or reject the offer in its entirety by sending an ACCEPT or a REJECT message as a reply. The responder can also reply with a counter-offer by using the COUNTER reply accompanied by the counter proposal. In this case, the proposer has the same options and therefore can reply with a counter proposal of its own. If either party is satisfied with the current iteration of the proposal, that party can send an ACCEPT message to the other party. Either party can signal its dissatisfaction and abort the negotiation session by sending a REJECT message. To seal the agreement, the other party has to send a CONFIRM message and receive a CONFIRM-ACCEPTANCE message in reply.

The method, as presented here, has general application and is isolated from the proposal which enumerates the requirements of the proposer. There are no time limits imposed on the negotiation process as such constraints can provide undue advantage to one of the parties [39]. There is no central co-ordinator to manage the negotiations, and either of the parties can leave the process at any time. Therefore, the method satisfies the desired attributes of simplicity, distribution and symmetry, for a negotiation mechanism [40].

Negotiation and Advance Reservation

An advance reservation is a commitment made by a resource provider to provide a guaranteed share of a computing resource to a resource consumer at a definite time in the future [36]. An advance reservation mechanism therefore, allows a consumer to provision enough resources to meet requirements such as deadlines, in environments such as grids where availability of shared resources varies from time to time. Since an advance reservation is also a commitment by the provider, it may be made in lieu of a reward or payment to the provider. Failure to meet this commitment may result in the provider having to pay a penalty. Therefore, a reservation represents an instantiation of an SLA. A provider with a profit motive would aim to maximise his revenue while minimising the risk of penalties [41]. Similarly, a consumer would like to gain the maximum guarantee for meeting his QoS requirements but at the lowest possible cost. A number of strategies can be adopted by both the provider and the consumer depending on their individual needs and situations. As a result, a consumer's plan for resource usage may not be favoured by a provider. However, the provider can indicate its expectations by changing the relevant parts of the proposal and returning it to the consumer. In this manner, proposals can be exchanged back and forth until both parties reach an agreement or decide to part ways.

Negotiation for advance reservation of resources was implemented according to the this embodiment using the above-described .NET-based resource management platform (comprising computers running Microsoft Windows operating system) and the Gridbus (trade mark) Grid resource broker. The above-described platform acts as the resource provider in this implementation. For a given user application, the Gridbus broker discovers appropriate resources for executing the application, schedules user jobs on the resources, monitors their execution and retrieves results once the jobs are completed. Negotiation for advance reservations is, therefore, performed by the Gridbus broker as a resource consumer on behalf of the user.

a) Gridbus Broker

The Gridbus broker has been used to realise economy-based scheduling of computational and data-intensive applications on grid resources [42]. Advance reservations enable the broker to provide guarantees for meeting the user's QoS requirements for the execution, such as deadline and budget. The required abilities for negotiation within the broker are brought about by a negotiation-aware scheduler and a negotiation client.

The negotiation client is the interface to the corresponding service on the remote side. It is not specific to the platform of the above embodiment, however, and can support any other middleware that implements the protocol. The scheduler is aware of the negotiation client only as a medium for submitting proposals and receiving feedback from the remote side. However, separate schedulers may be required for different SLA negotiation protocols, as certain features (e.g., presence or absence of a counter-proposal method) may affect negotiation and scheduling strategies.

A broker is associated with a single distributed bag-of-tasks application. The deadline and budget is provided for each application as a whole by the user. The deadline value is used by the broker to determine the number of nodes to be reserved, and the budget value puts a ceiling on the maximum expense for the execution. The broker's negotiation strategy for negotiating with the provider is as follows:

1. Get user's QoS and application requirements
2. $$Nodes \leftarrow \frac{\sum^{Est(j)}}{fx(deadline - start\_time)}$$
3. Create proposal for Nodes
4. Choose a provider based on attributes such as cost
5. repeat
6.   Submit proposal to the provider
7.   repeat
8.     if (state is COUNTERED) then
9.       if (counter proposal is within deadline) then
10.        send (ACCEPT)
11.      else if (f < 1) then
12.        Increase f
13.        Recalculate Nodes
14.        Create new proposal for Nodes
15.        send (COUNTER, proposal)
16.      else
17.        send (REJECT)
18.    end
19.    if (state is ACCEPTED) then
20.      send (CONFIRM)
21.    end
22.    until (a final state is reached)
//Final state is REJECTED or CONFIRMED or FAILED
23.    if (previous state was REJECTED or FAILED) then
24.      Find another provider to repeat the process
25.  until (enough nodes are obtained OR there are no more providers)
26.  if Reservation was successful then
27.    Wait until reservation start time
28.  else
29.    Inform the user and exit the application The expression in Line 2 (above) calculates the number of nodes that are required for executing the distributed application within the deadline. The estimated time for completing a job is provided by the user. The broker adds to this an additional estimate for staging the jobs on to the remote machine, invoking it and collecting the results for the job. The total estimated time for each job is summed to obtain the maximum time required to execute the application (i.e. its sequential execution time on a single remote processor). This is the numerator in the expression in Line 2.

The denominator is the wallclock time available to execute the application, that is, the time difference between the deadline and the starting time for the reservation. The starting time is estimated as the time when the negotiations would have likely concluded and the job scheduling can commence. As the broker's utility lies in executing the users' job as quickly as possible, the time available is further reduced by multiplying against an aggression factor, denoted by f, where $0 < f \leq 1$. However, the smaller the time available, the larger is the number of nodes required.

The broker creates a proposal and chooses one out of a list of resource providers—based on factors such as resource price or capability—to initiate a negotiation session and submit the proposal. If the proposal is accepted straightaway, then a confirmation message is returned to the provider. If a counter proposal is received, then it is evaluated to see whether the counter reservation is still within the deadline. If so, then it is accepted by the broker. If not, then the aggression factor is increased to reduce the number of nodes required. This is done on the assumption that requests for smaller number of nodes have better chances to be accepted or found more acceptable (earlier) counter time slots. This continues until the aggression factor is increased up to 1 which is the maximum latitude available to broker. If the counter proposal from the resource provider does not satisfy the deadline requirements, the proposal is rejected and the session closed.

Figure 10:
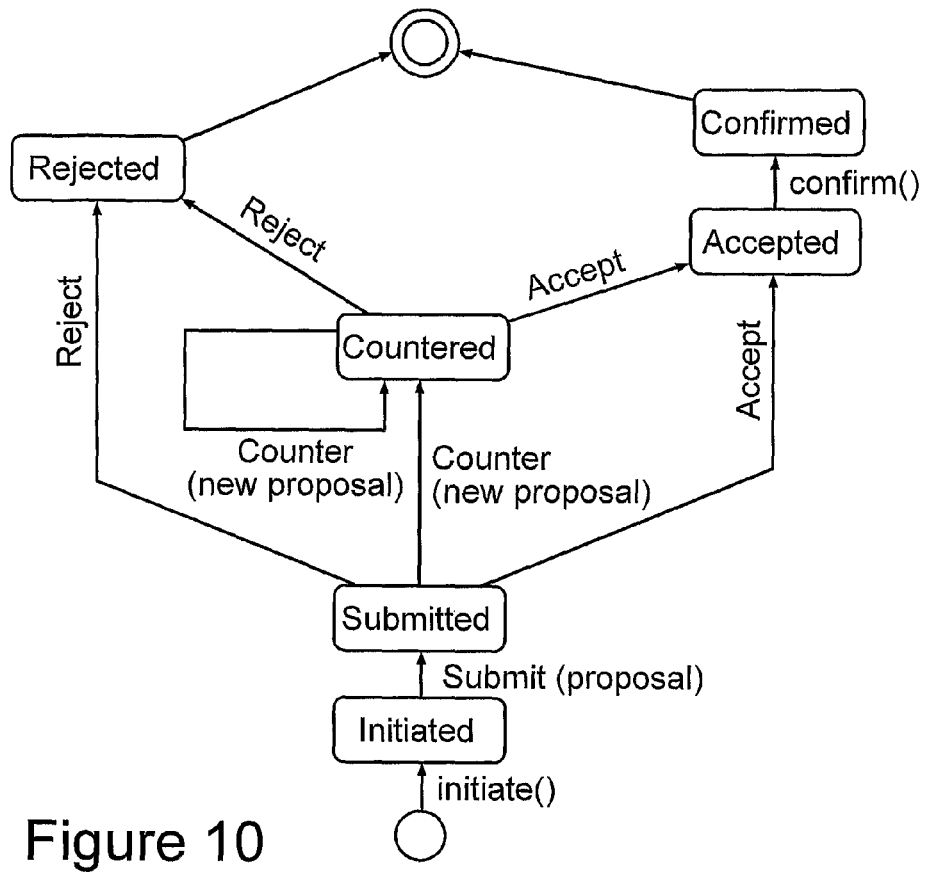
FIG. 10 is a schematic view of a negotiation state machine according to another embodiment of the present invention.

The broker keeps track of the negotiation process through a state machine illustrated schematically in FIG. 10 and implemented using the State software design pattern. The actions are encoded in the State objects which prevents the broker from performing invalid actions in certain states, such as by replying to a REJECT message with a CONFIRM message. The transition between the states is guided by the broker's strategy and the responses from the provider.

b) The Platform of the Above Embodiment

In the enterprise grid computing platform of the above embodiment, the capabilities of each node are determined by the functionality offered by the services hosted in a service container that provides common security, message handling and communication functions. For example, hosting a task executor service in the container enables a node to execute independent tasks. Any number of such services may be hosted thereby, potentially allowing the same node to execute applications implemented using different programming models. A node functions as a scheduler for an application if it hosts the scheduler service corresponding to the application's programming model (e.g. task scheduler for the task farming model). Executors in this platform's grid register with or are discovered by a specific scheduler service which then allocates work units across them.

Figure 11:
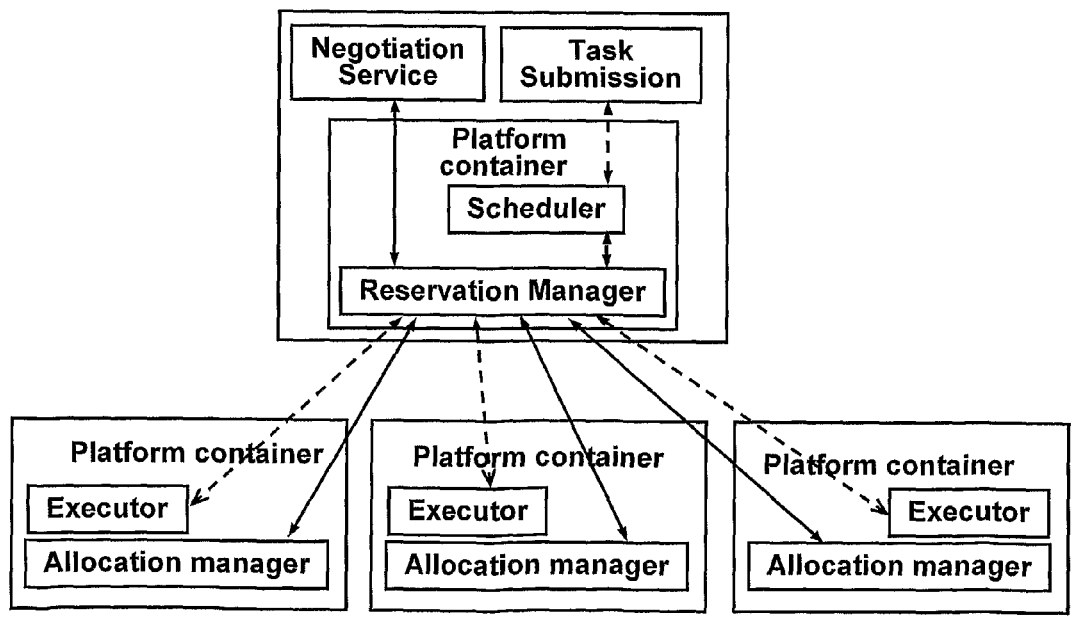
FIG. 11 is a schematic view of the architecture for resource reservation in the enterprise grid computing platform of FIG. 1.

FIG. 11 is a schematic view of the architecture for resource reservation in the platform of the above embodiment. The advance reservation capability in the platform of the above embodiment is enabled by two components, the Allocation Manager at the executor end and the Reservation Manager at the scheduler end. The Allocation Manager underlies all the executor services on a node. It determines which of the executors are allowed to run, and the share of the node that is allowed for each. The Allocation Manager therefore takes care of allocating and enforcing reservations on a single node. The Allocation Manager is associated with a policy object that encodes the utility function of the node. For example, this may specify a maximum duration that can be specified for a reservation request at the node level.

The Reservation Manager is co-located with a scheduler and is able to perform reservations across the nodes whose executors are registered with the scheduler. The Reservation Manager determines which of the reservation requests coming from users are to be accepted based on factors such as feasibility, profitability or improvement in utilisation. For this reason, it is associated with a QoS Policy object that represents the reservation policy at the level of the entire system. For example, this object may specify a minimum reward for considering a reservation request. External applications interface with the platform's resource reservation system through Negotiation Service, hosted as a web service. The latter implements the negotiation method described above and illustrated in FIG. 9, and interfaces with the Reservation Manager for forwarding reservation requests that arrive from external entities. The web service implementation enables non-.NET programs, such as the Gridbus broker, to interface with the platform of the above embodiment system.

The algorithm for handling resource reservation requests in the Reservation Manager of the platform is as follows:
At the Reservation Manager:

```
1. for each incoming reservation request do
2.      if (QoS Policy is violated) then
3.          send (REJECT)
4.      Get available nodes from Information Service
5.      Filter the nodes as per requirements
6.      if (available nodes < requested nodes) then
7.          send (REJECT)
8.      Broadcast requested timeslot to all available nodes
9.      Wait for response
10.     if (agreed nodes ≧ required nodes) then
11.         send (ACCEPT)
12.     else
13.         Search for a timeslot which is commonly free for
                at least required number of nodes
14.         if (timeslot is found) then
15.             send (COUNTER, new_timeslot)
16.         else
17.             send (REJECT)
18.     end
19. end
```

At the Allocation Manager:

```
20. for each incoming request do
21.     if (reservation policy is violated) then
22.         send (REJECT)
23.     else
24.         if (timeslot is available) then
25.             send (ACCEPT)
26.         else
27.             send (COUNTER, new_timeslot)
28. end
```

A timeslot is the period for which the reservation is required. Lines 2-3 (above) control the admission of requests as per the policy specified in the QoS Policy object. Once the request is approved, the request is broadcast to all the available nodes in the grid. At the node, the Allocation Manager checks if its reservation policy is violated. If not, and the node is free for the requested timeslot, then the Allocation Manager indicates it is available. If the node is not free, then an alternate time slot is provided to the Reservation Manager (Lines 20-25). The Reservation Manager checks if the required number of nodes have indicated that they are their available during the requested timeslot. If so, an ACCEPT reply is sent. If not, the Reservation Manager uses the alternate timeslots provided by the nodes to find a common alternative timeslot for the same duration as requested, when the required number of nodes are available. This timeslot is then sent as a counter proposal to the consumer. If such a timeslot cannot be found, then a REJECT reply is sent (Lines 10-18).

c) Control Flow during Negotiation

As per the negotiation method described above by reference to FIG. 9, when the broker sends an initiate message, the above platform's Negotiation Service returns a 16 byte globally unique identifier (GUID) for the session. The GUID is generated according to the proposed IETF Universally Unique Identifier standard [24]. The broker then submits a proposal to the Negotiation Service in the XML format as follows:

```
<xml-fragment
    xmlns:ws="http://www.gridbus.org/negotiation/">
    <ws:Reward>1000.0</ws:Reward>
    <ws:Penalty>0.0</ws:Penalty>
    <ws:Requirements>
        <ws:ReservationRecordType>
        <ws:ReservationStartTime>
        2008-04-01T18:22:00.437+11:00
        </ws:ReservationStartTime>
        <ws:Duration>750000.0</ws:Duration>
        <ws:NodeRequirement>
    <ws:Count>4</ws:Count>
        </ws:NodeRequirement>
        <ws:CpuRequirement>
    <ws:Measure>Ghz</ws:Measure>
    <ws:Speed>2.5</ws:Speed>
        </ws:CpuRequirement>
        </ws:ReservationRecordType>
    </ws:Requirements>
</xml-fragment>
```

The ws:Reward field in the proposal above indicates the provider's gain if the proposal were accepted and the requirements met. The ws:Penalty field denotes the penalty to be paid if the provider accepted the proposal but did not supply the required resources. The ws:Requirements section consists of one or more reservation records (ws:ReservationRecordType) that detail the resource configuration required in terms of number of nodes, their capability (e.g. CPU speed) and the time period for which they are required. For example, the proposal (above) asks for 4 nodes with a minimum CPU speed of 2.5 GHz each for duration of 750 seconds starting from 6:22 p.m. on 1st of April 2008 with a reward of 200 currency units and penalty of 50 currency units. The proposal is parsed and converted to a reservation requirement object that is sent to the Reservation Manager.

Figure 12:
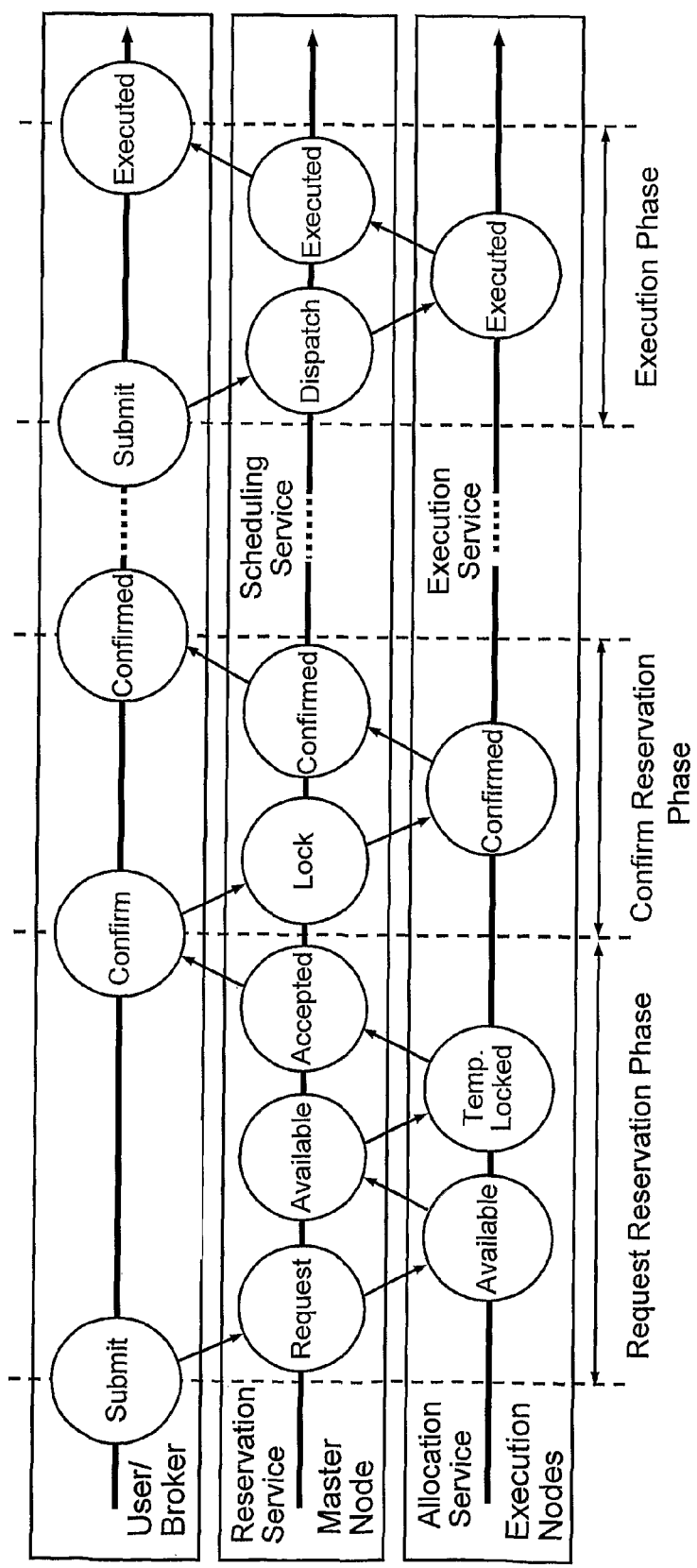
FIG. 12 is a schematic view of control flow for a successful resource reservation in the embodiment of FIG. 9.

When a proposal is finally accepted, the Reservation Manager executes a two phase commit to finalise the reservation. In the initial phase, it requests the respective Allocation Managers to "soft" lock the time slot for that particular request. A soft lock in this case is an entry for the time-slot in the Allocation Manager database which is removed if a confirmation is not received within a certain time-interval. Once all the nodes successfully acknowledge that this operation has been performed, the reservation manager then sends an ACCEPT message to the broker. If the broker then sends a CONFIRM message, the Reservation Manager asks the respective Allocation Managers to commit the reservation. On receiving their acknowledgement, a CONFIRM ACCEPTANCE message is returned to the broker. The negotiation session identifier is then used as a reference for the resource reservation (reservation ID) by subsequent tasks. This process is illustrated schematically in FIG. 12.

The task submission is also mediated by the resource reservation architecture. If a task arrives with a reservation ID, the Reservation Manager first checks if the ID is valid, and then locates the nodes that are associated with that ID. The task is then dispatched to one of these nodes, in a round robin fashion.

This negotiation architecture was evaluated using a grid test-bed constructed by installing the platform of the above embodiment on 13 desktop computers running Microsoft Windows XP in a local area network. One instance of Reservation Manager service was installed on the node acting as the scheduler and the others ran the Allocation Manager service. This meant that up to 12 nodes could be reserved by brokers by interacting with the sole Reservation Manager using the negotiation protocol described above.

In order to emulate multiple clients with different applications that have different deadlines, a set of brokers was created with different deadlines generated using a uniform random distribution. The deadlines were chosen so as to reflect different levels of urgency-from a strict deadline for a high-urgency application to a relaxed deadline for a low-urgency application. The urgency was calculated from the following ratio time estimated for executing the complete application. In this evaluation, the sequential execution time is considered as the maximum execution time for the application. The deadline is considered very strict when r<0:25, moderately strict when 0:25<r<0:5, relaxed when 0:5<r<0:75, and very relaxed when r>0:75.

The maximum execution time was the same for all the applications in this evaluation. According to the protocol for handling resource reservation of this embodiment (see above), when the broker makes a request and the platform of the above embodiment is not able to provide the required number of nodes at the requested start time, the latter finds an alternative start time when the nodes can be provided. The difference between the alternative start time and the one requested originally is termed as the slack. The slack allowed for reservation start time is a function of the urgency of the deadline, and indicates the relaxation allowed in the broker's requirements.

The brokers were launched at closely-spaced intervals from two computers that were part of the same local area network but separate from the grid nodes. This created the effect of different requests with different deadlines arriving simultaneously at the Reservation Manager. The objectives of this experiment was to measure the impact of deadlines on the responses adopted by both the broker and the Reservation Manager.

Figure 13:
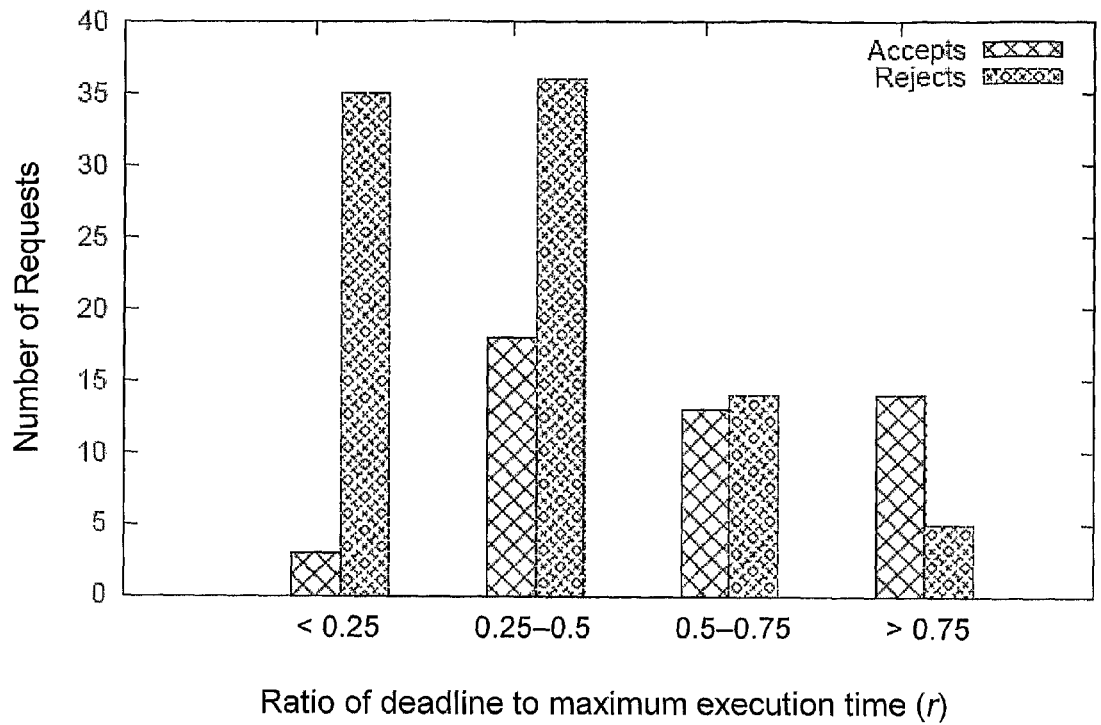
FIG. 13 is a plot of the distribution of accepted and rejected requests against deadline urgency from an experimental evaluation of the embodiment of FIG. 9 that involved 138 advance reservation requests arriving at the Reservation Manager of the platform of FIG. 1 in the space of 4 hours.
Figure 14:
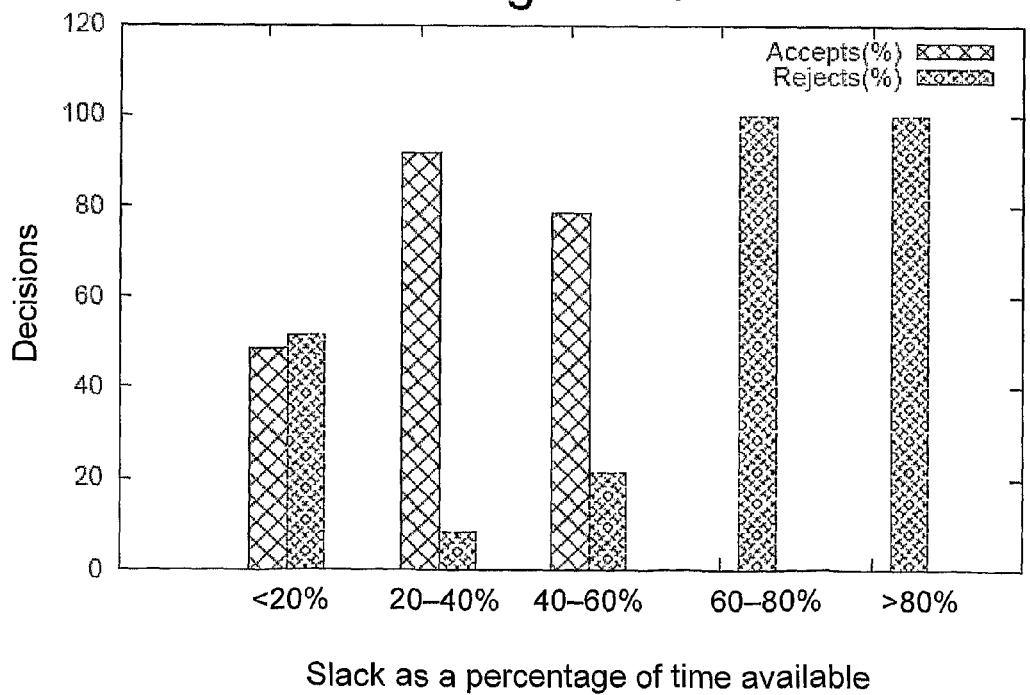
FIG. 14 is a plot of the distribution of accept and reject decisions according to delay in reservation start time from the experimental evaluation of the embodiment of FIG. 9.
Figure 15:
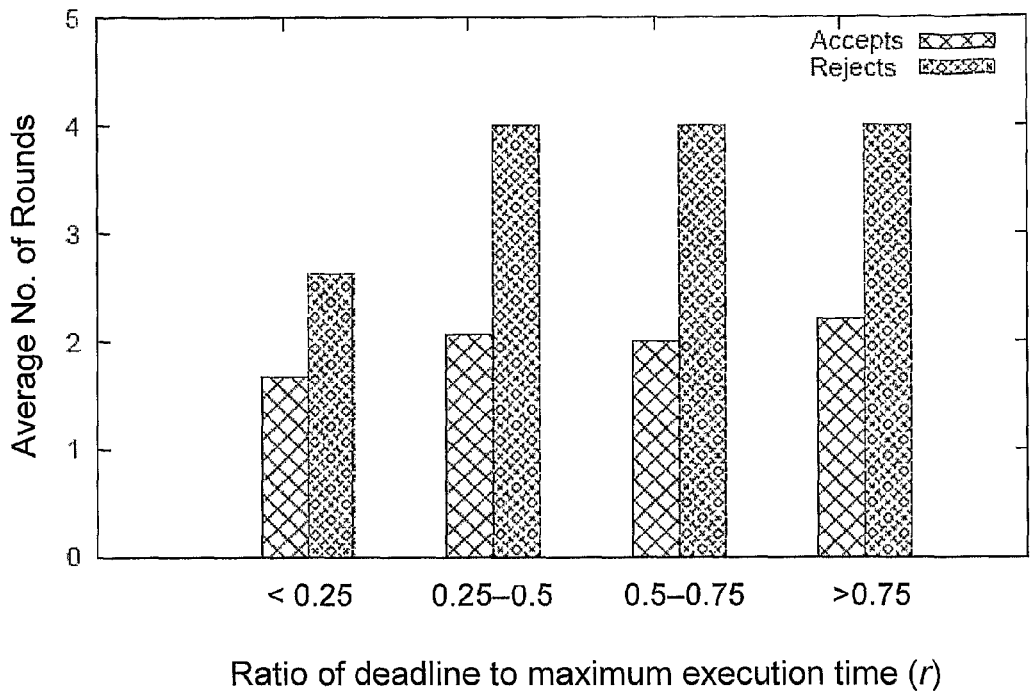
FIG. 15 shows the average number of negotiation rounds taken to obtain a result for requests with different deadlines from the experimental evaluation of the embodiment of FIG. 9.

FIGS. 13 to 15 show the results of an evaluation that involved 138 advance reservation requests arriving at the above platform's Reservation Manager in the space of 4 hours. Nearly 17% of the total requests were decided in the first round itself (i.e., a straightaway accept or reject decision from the above platform) while the rest were decided after multiple rounds of negotiation between the broker and the Manager. In all, 35% of the requests were accepted while 65% of the requests were rejected. Since the evaluation covered a scenario where the demand for computing nodes would exceed their supply, it is only to be expected that a majority of the requests will be rejected. However, the system was still able to generate alternatives for 83% of the requests.

FIG. 13 plots the distribution of the accepted and rejected requests against the urgency of application deadlines. It can be seen that the proportion of accepted requests increases when the deadlines progress from very strict to very relaxed. When normalised against the number of requests for each data point, the percentage of accepted requests increases from 8% for strict deadlines to 74% in the case of very relaxed deadlines. This is because the broker is more willing to accept a delayed reservation when the deadlines allow more slack. Also, owing to the negotiation strategy adopted by the broker (see above), applications with urgent deadlines require more nodes for a shorter duration than those with relaxed deadlines. The platform of the above embodiment was therefore able to generate better counter offers for requests involving lesser number of nodes, even if their duration is longer.

This inference is supported by the graphs in FIG. 14, which plots the percentage of accept and reject decisions according to the slack allowed in the reservation start time. The slack is indicated as a percentage of the time available (i.e. deadline minus original start time) for the broker to execute the application. It can be seen here that the broker is willing to accept counter-offers with up to 60% slack in reservation start time. Indeed, 90% of the counter-offers with up to 40% slack are accepted by the broker. However, counter-offers with more than 60% slack are unacceptable. A significant amount of proposals are rejected by the Reservation Manager without counter-offers (zero slack time) as they require more nodes than what is available. These are included in the data point corresponding to offers with <20% slack at the far left of FIG. 14.

A request-response pair between the broker and the above platform's Reservation Manager is termed as a round of negotiation. FIG. 15 shows the average number of negotiation rounds taken to obtain a result for requests with different deadlines. For this evaluation, the aggression factor was set to 0.5 and then increased by 0.25 for every round. Therefore, including the submission request, a maximum of 4 rounds (3 offers each and a final decision) was possible for this evaluation. For very strict deadlines, many of the offers were rejected or accepted in the first round itself. Therefore, the average number of rounds is the least in this case. For more relaxed deadlines, the broker is willing to negotiate for the maximum number of rounds before the request is rejected.

Notably, the broker was able to fulfil its QoS requirement without having to reveal its deadline preference to the provider by choosing an acceptable counter proposal whenever possible. Thus, by modifying the proposal suitably, both parties were able to convey feedback without revealing their preferences. This prevents providers from taking undue advantage or playing consumers against each other in scenarios where different brokers may be competing for access to the same set of resources.

ii) Map Reduce Programming Model

The map reduce programming model proposed by Google, Inc. has also been implemented within the platform of the above embodiment. Developers can use two functions ("map" and "reduce") to parallelize their applications within the platform. The implementation provides three major components: the map reduce scheduling service, the map reduce execution service and the map reduce client manager.

.NET is the standard platform of Windows applications and it has been extended to support parallel computing applications. For example, the parallel extension of .NET 4.0 supports the Task Parallel Library and Parallel LINQ, while MPI.NET [53] implements a high performance library for the message passing interface, so it is expected that .NET will be present as a component for Windows-based data centres. According to the present invention, there is provided an implementation of MapReduce for the .NET platform, referred to herein as MapReduce.NET, according to the present invention. The following embodiments are described below:

MapReduce.NET: a MapReduce programming model designed for the .NET platform with the C# programming language.

A runtime system of MapReduce.NET deployed in an Enterprise Grid environment by the assistance of the enterprise grid computing platform described above.

A distribute storage system, referred to as WinDFS, which can support a distributed storage service required by MapReduce.NET.

MapReduce is triggered by "map" and "reduce" operations in functional languages, such as Lisp. This model abstracts computation problems through two functions: map and reduce. All problems formulated in this way can be parallelized automatically. MapReduce allows users to write Map/Reduce components with functional-style code. These components are then composed as a dataflow graph with fixed dependency relationship to explicitly specify its parallelism. Finally, the MapReduce runtime system can transparently explore the parallelism and schedule these components to distributed resources for execution.

All data processed by MapReduce are in the form of key/value pairs. The execution happens in two phases. In the first phase, a map function is invoked once for each input key/value pair and it can generate output key/value pairs as intermediate results. In the second phase, all the intermediate results are merged and grouped by keys. The reduce function is called once for each key with associated values and produces output values as final results.

The Mapreduce Model

A map function takes a key/value pair as input and produces a list of key/value pairs as output. The type of output key and value can be different from input key and value:
map::(key$_1$,value$_1$)⇒list(key$_2$, value$_2$)
A reduce function takes a key and associated value list as input and generates a list of new values as output:
reduce::(key$_2$,list(value$_2$))⇒list(value$_3$)

MapReduce Execution

A MapReduce application is executed in a parallel manner through two phases. In the first phase, all map operations can be executed independently with each other. In the second phase, each reduce operation may depend on the outputs generated by any number of map operations. However, similar to map operations, all reduce operations can be executed independently.

From the perspective of dataflow, MapReduce execution consists of m independent map tasks and r independent reduce tasks, each of which may be dependent on m map tasks. Generally the intermediate results are partitioned into r pieces for r reduce tasks.

The MapReduce runtime system schedules map and reduce tasks to distributed resources. It handles many tough problems: parallelization, concurrency control, network communication, and fault tolerance. Furthermore, it performs several optimizations to decrease overhead involved in scheduling, network communication and intermediate grouping of results.

The Enterprise Grid Software Platform

The platform of the above embodiment is used to deploy MapReduce.NET in distributed environments. Each node of that platform consists of a configurable container, hosting mandatory and optional services. The mandatory services provide the basic capabilities required in a distributed system, such as communications between Aneka nodes, security, and membership. Optional services can be installed to support the implementation of different programming models in Grid environments. MapReduce.NET is implemented as optional services of this platform.

Figure 16:
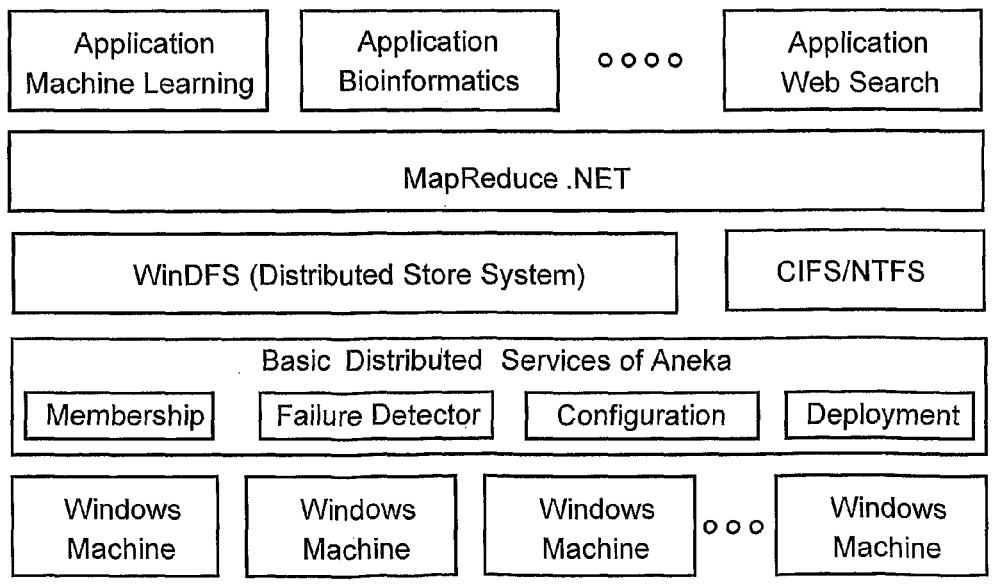
FIG. 16 is a schematic illustration of the architecture of an implementation of MapReduce for the .NET platform, referred to herein as MapReduce.NET, according to an embodiment of the present invention.

There are several MapReduce implementations, respectively for data centres [48][56], shared memory multi-processor [51] and the Cell architecture [59]. The design of MapReduce.NET aims to reuse as many existing Windows components as possible. FIG. 16 is a schematic illustration of the architecture of MapReduce.NET; this implementation is assisted by several distributed component services from the platform of the embodiment of FIG. 1.

WinDFS supports MapReduce.NET with a distributed storage service over the .NET platform. WinDFS organizes the disk spaces on all the available resources as a virtual storage pool and provides an object based interface with a flat name space, which is used to manage data stored in it. To process local files, MapReduce.NET can also directly talk with CIFS or NTFS.

The implementation of MapReduce.NET exposes similar APIs as Google MapReduce. The API for Map Function and the API for Reduce Function as presented to users in C# language are as follows:

API for Map Function:

```
abstract class Mapper
{
    abstract void Map(object key, object
    value)
}
```

API for Reduce Function:

```
abstract class Reducer
{
    abstract void Reduce(IEnumerator
    values)
}
```

To define Map/Reduce functions, users need to inherit from Mapper or Reducer class and override corresponding abstract functions. To execute the MapReduce application, the user first needs to create a MapReduceApp class (illustrated below), and set it with corresponding Mapper and Reducer classes. The execution API for applications is as follows:

```
class MapReduceApp
{
    void RegisterMapper (Type mapper)
    void RegisterReducer(Type reducer)
    void SetInputFiles(list input)
    list GetOutputFiles( )
    bool Execute( )
}
```

Then, input files should be configured before starting the execution, as illustrated above (see the API for Reduce Function). The input files can be local files or files in the distributed store.

The input data type to the Map function is the object, which is the root type of all types in C#. For Reduce function, the input is organized as a collection and the data type is (Enumerator, which is an interface of supporting an iteration operation on the collection. The data type of each value in the collection is also object.

With object, any type of data, including user defined or system build-in type, can be accepted as input. However, for user defined types, users need to provide methods to extract their data from a stream, which may locate in memory or disk.

Figure 17:
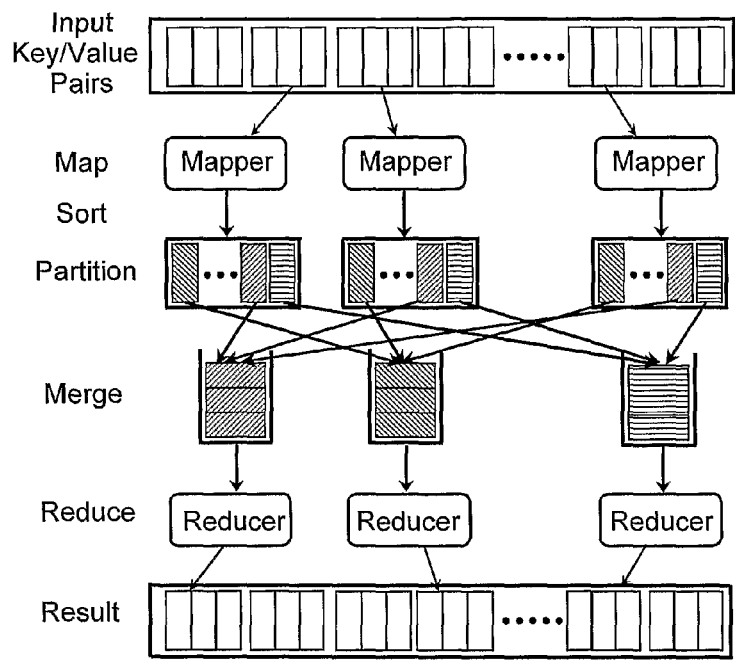
FIG. 17 is a schematic illustration of overall flow of execution of MapReduce computation in .NET environments according to the embodiment of FIG. 16.

The execution of a MapReduce computation in .NET environments according to this embodiment consists of five major phases: Map, Partition, Sort, Merge and Reduce. The overall flow of execution is illustrated in FIG. 17. The execution starts with the Map phase. It iterates the input key/value pairs and invokes the map function defined by users on each key/value pair. The results generated by the Map phase are passed to the Partition, Sort and Merge phases, which perform sorting and merging operations to group the values with identical keys. The result is an array, each element of which is a group of values for each key. Finally, the Reduce phase takes the array as input and invokes the reduce function defined by users on each element of the array.

Figure 18:
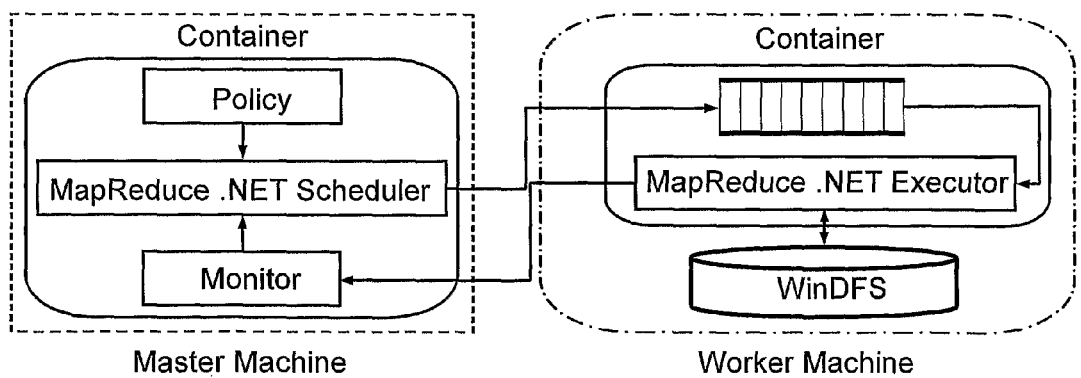
FIG. 18 is a schematic illustration of a normal configuration of MapReduce.NET of FIG. 16 with the platform of FIG. 1.

The execution of MapReduce.NET is orchestrated by a scheduler. The scheduler is implemented as a MapReduce.NET Scheduler service in Aneka, while all the major five phases are implemented as a MapReduce.NET Executor service. With the platform of FIG. 1, the MapReduce.NET system can be deployed in cluster or data centre environments. Typically, the runtime system consists of one master machine for a scheduler service and multiple worker machines for executor services. FIG. 18 is a schematic illustration of a normal configuration of MapReduce.NET with the platform of FIG. 1, in which each worker machine is configured with one instance of executor and the master machine is configured with the scheduler instance.

After users submit MapReduce.NET applications to the scheduler, it deploys the scheduling policy from configuration to map sub tasks to different resources. During the execution, it monitors the progress of each task and takes corresponding task migration operation in case some nodes are much slower than others due to heterogeneity or interference of dominated users.

The details of each major phase on the executor of MapReduce.NET are as follows.

Map Phase: The executor extracts each input key/value pair from the input file. For each key/value pair, it invokes the map function defined by users. The result generated by the map function is first buffered in the memory. The memory buffer consists of many buckets and each one is for different partition. When the size of all results buffered in the memory reaches a predefined maximal threshold, they are sent to the sort phase and written to the disk to save space for holding intermediate results of next round of map invocations.

Partition Phase: Partition of the results generated by map functions is achieved in two places: in memory and on disk. In the Map phase, the results generated by map function are first buffered in memory, where there is one bucket for each partition. The generated result determines its partition through a hash function, which may be defined by users. Then the result is appended to the tail of bucket of its partition. When the size of buffered results exceeds the maximal threshold, each bucket is written to disk as an intermediate file. After one map task finishes, all the intermediate files for each partition are merged into one partition.

Sort Phase: Before the buffered results are written to disk, elements in each bucket are sorted in memory. They are written to disk by the sorted order, maybe ascending or descending. The sort algorithm we adopt is quick sort [63]. On average, the complexity of this algorithm is $O(n \cdot \log(n))$, chosen because it is always reported faster than other sort algorithms.

Merge Phase: To prepare inputs for the Reduce phase, we need to merge all the intermediate files for each partition. Firstly, the executor fetches intermediate files, which are generated in the Map phase, from neighbour machines. Then, they are merged to group values with same key and at the same time, sort keys by a predefined order. Since all the key/value pairs in the intermediate files are already in a sorted order, we deploy a heap sort to achieve the group operation. Each node in the heap corresponds to one intermediate file. Repeatedly, the key/value pair is picked on the top node, and then the shape of the heap is adjusted to sift the heap node with the biggest key up to the top position. At the same time, the values associated with same key are grouped.

Reduce Phase: In this embodiment, the Reduce phase is combined with the Merge phase. During the process of heap sort, we combine all the values associated with same key and then invoke the reduce function defined by users to perform reduction operation on these values. All the results generated by reduce function are written to disk according the order by which they are generated.

Memory Management

On each executor, the memory consumed by MapReduce.NET mainly includes memory buffers for intermediate results, memory space for quick sort and buffers for input and output files.

Figure 19:
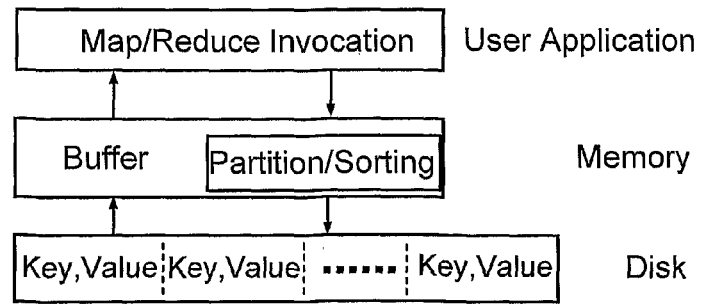
FIG. 19 is a schematic illustration of memory management in MapReduce.NET of FIG. 16.

In configuration, the administrator can specify a maximal value for the size of memory used by MapReduce.NET. This size is normally determined by the physical configuration of machines and the memory requirement of applications. The memory management is illustrated schematically in FIG. 19.

The memory buffer used by intermediate results and input/output files are set according to this maximal memory configuration, with a default buffer size of input/output files of 16 MB. The input and output files are from a local disk, so FileStream in .NET is used to control the access to local files, including configuration of the size of file buffer.

The memory buffer for intermediate results is implemented by MemoryStream of .NET, which is actually a stream in memory. All the results generated by map function are translated into byte array and append to the tail of the stream in memory. An array of indices is used to facilitate accessing each element in this stream. Indices in this array record the position of each intermediate value in the stream. When the size of the stream in memory plus the size of index array exceeds the predefined maximal value, quick sort is invoked to sort all the buffered intermediate values and then write them to disk.

WinDFS

In order to provide a distributed storage system MapReduce.NET, WinDFS is provided according to this embodiment using the C# programming language. WinDFS can be deployed in a dedicated cluster environment or a shared Enterprise Grid environment. Every machine running a WinDFS instance can contribute a certain amount of disk space. All the contributed disk spaces are organized as a virtual data pool. WinDFS provides an object based interface with a flat name space for that data pool. The object can also be taken as a file. Each object contained in WinDFS is identified by a unique name, which is actually a GUID in .NET. WinDFS supports put and get operations on objects.

The runtime system of WinDFS consist of an index server with a bunch of object server. Objects are distributed to object servers, while the location information for each object is maintained by the index server. The index server also is responsible for keeping the reliability of objects in the system.

As a representative configuration, the instance of object server runs on each worker machine for managing local objects, while the meta server can be on the master machine.

Schedule Framework

Scheduling in this embodiment is conducted by the MapReduce.NET scheduler. The major five phases of MapReduce.NET are grouped into two tasks: Map task and Reduce task. The Map task executes three phases: map, partition and sort, while the Reduce task executes merge and reduce. Given a MapReduce.NET job, it consists of m Map tasks and r Reduce tasks. Each Map task has an input file and generates r result files. Each Reduce task has m inputs files, which are generated by m Map tasks.

Normally the input files for Map tasks are ready in WinDFS prior to execution and thus the size of each Map input file can be determined before scheduling. During the execution, Map tasks dynamically generate output files, the size of which is difficult to determine prior to job execution.

The system aims to be deployed in an Enterprise Grid environment, which essentially organizes idle resources within a company or department as virtual super computer. Normally, resources in Enterprise Grid are shared by two categories of users. The first one is the owner of resources, who has priority to use their resources; the second one is the users of idle resources, who should not disturb the normal usage of resource owner. Therefore, with an Enterprise Grid, besides the known problems of a distributed system, such as complex communications and failures, there is also that of "soft failure". Soft failure refers to the scenario in which the resource involved in MapReduce execution has to quit computation owing to domination by its owner.

Owing to the above dynamic features of MapReduce.NET application and Enterprise Grid environments, a static scheduling algorithm was not chosen. Instead, a just-in-time scheduling policy was deployed for mapping Map and Reduce tasks to distributed resources in an Enterprise Grid.

The scheduling algorithm for the MapReduce.NET applications starts with scheduling Map tasks. Specifically, all Map tasks are scheduled as independent tasks. The Reduce tasks, however, are dependent on the Map tasks. Whenever Reduce task is ready, that is, all its inputs are generated by Map tasks, it will be scheduled according to status of resources. The scheduling algorithm aims to optimize the execution time for MapReduce.NET, which is achieved by minimizing the execution of Map and Reduce phases respectively.

During execution, each executor waits task execution commands from the scheduler. For a Map task, normally its input data locates locally. Otherwise, the executor needs to fetch input data from neighbors. For a Reduce task, the executor has to fetch all the input and merge them before execution. Furthermore, the executor monitors the progress of executing task and frequently reports the progress to the scheduler.

Performance Evaluation

MapReduce.NET, including the programming model, runtime system and scheduling framework, has been implemented and tested, and deployed on desktop machines at the University of Melbourne. Performance was evaluated for the runtime system based on two real applications: word count and distributed sort.

All the experiments are executed in an enterprise Grid consisting of 33 nodes. For distributed experiments, one machine was set as master and the rest were configured as worker machines. Each machine has a single Pentium 4 processor, 1 GMB of memory, 160 GB IDE disk (10 GB is dedicated for WinDFS storage), 1 Gbps Ethernet network and runs Windows XP.

Samples Applications

The two sample applications, word count and distributed sort, are benchmarks used by Google MapReduce and Phoenix systems. To implement the Word Count application, users split words for each text file in the map function and sum the appearance number for each word in the reduce function. For sort application, users do not have to do anything within map and reduce functions, while the MapReduce runtime system performs sorting automatically.

System Overhead

MapReduce can be taken as a parallel design pattern, which trades performance to improve the simplicity of programming Essentially, the Sort and Merge phases of MapReduce runtime system introduce extra overhead. However, the sacrificed perform cannot be overwhelming. Otherwise, it is not acceptable for users. The overhead of MapReduce.NET was evaluated with local execution. During local execution, the input is from local disk and all 5 major phases of MapReduce.NET executes sequentially on single machine. This is called a local runner and can be used for debug purposes.

For local execution, both sample applications were configured as follows:
  The Word Count application took the example text files used by Phoenix [51], with three settings of input sizes of raw data: 10 MB, 100 MB and 1 GB respectively.
  The Sort application sorts a number of records. Each record consists of a key and a value. Both the key and value are random integers. Three configurations of input size were adopted: 10 million, 100 million and 1,000 million records respectively. Correspondingly, the sizes of raw data are about 15 MB, 150 MB and 1.48 GB.

Figure 20A:
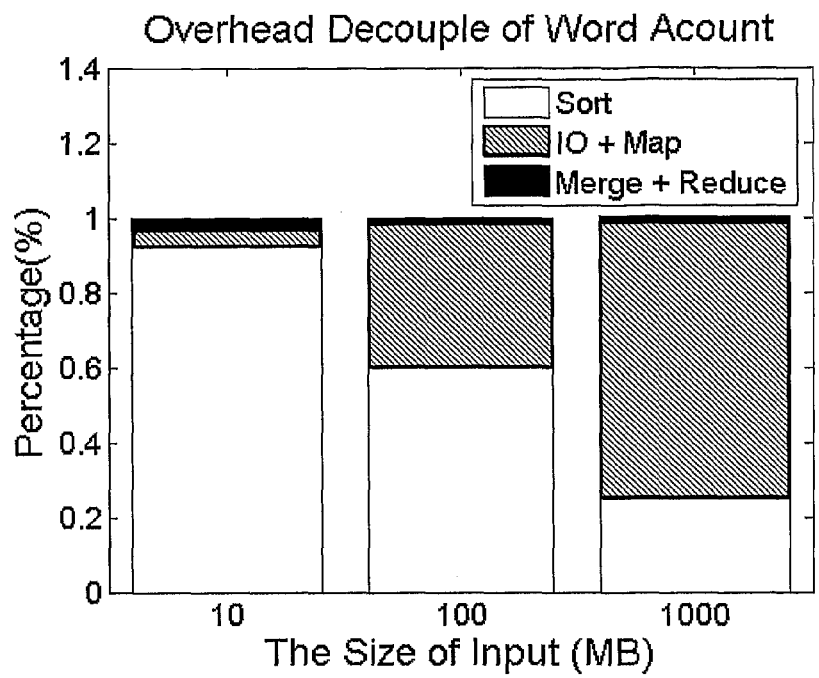
FIGS. 20A and 20B illustrate experimentally obtained overhead decouple from executing Sort and Word Count applications respectively with MapReduce.NET of FIG. 16.
Figure 20B:
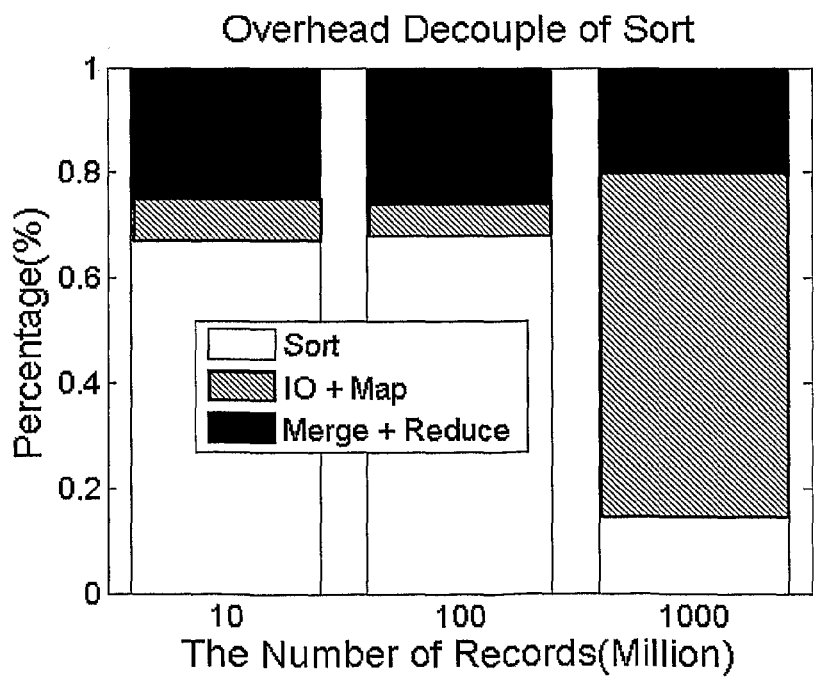

The performance result is split into three parts: sort, IO+Map and Merge+Reduce. The sort part is the execution consumed by the sort phase, while the time consumed by the rest of Map task is recorded by IO+Map part, which includes the time consumed by reading input file, invoking map functions and writing partitions of intermediate results to disk. The Merge+Reduce part is the execution time of the Reduce task. FIGS. 20A and 20B illustrate the percentage of these three parts for executing Sort and Word Count applications respectively. It is evident that different types of application have different percentage distribution for each part. For Word Count (see FIG. 20A), the time consumed by the reduce and merge phases can even be ignored. The reason is the size of results of Word Count is comparatively small. Differently from Word Count, the reduce and merge phases of Sort application (see FIG. 20B) still takes an important percentage. For both applications, as the growth of problem size, the percentage of IO+Map part is correspondingly increasing. Since the map and reduce function of both applications just executed very simple tasks, actually the time consumed by the IO+Map part mainly consists of the contributions from IO operations.

Figure 21A:
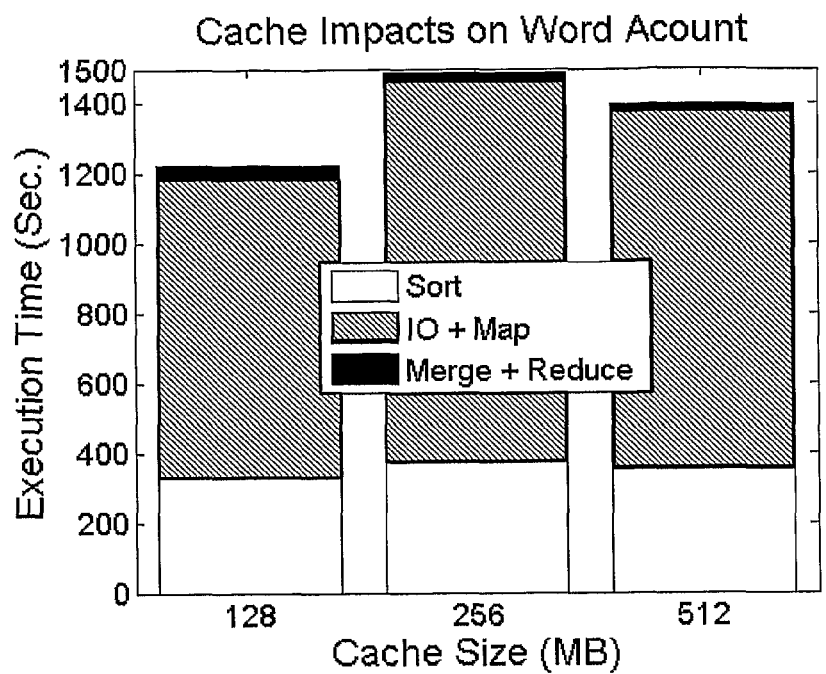
FIGS. 21A and 21B illustrate experimentally obtained cache impacts of MapReduce.NET of FIG. 16 from executing Sort and Word Count applications respectively.
Figure 21B:
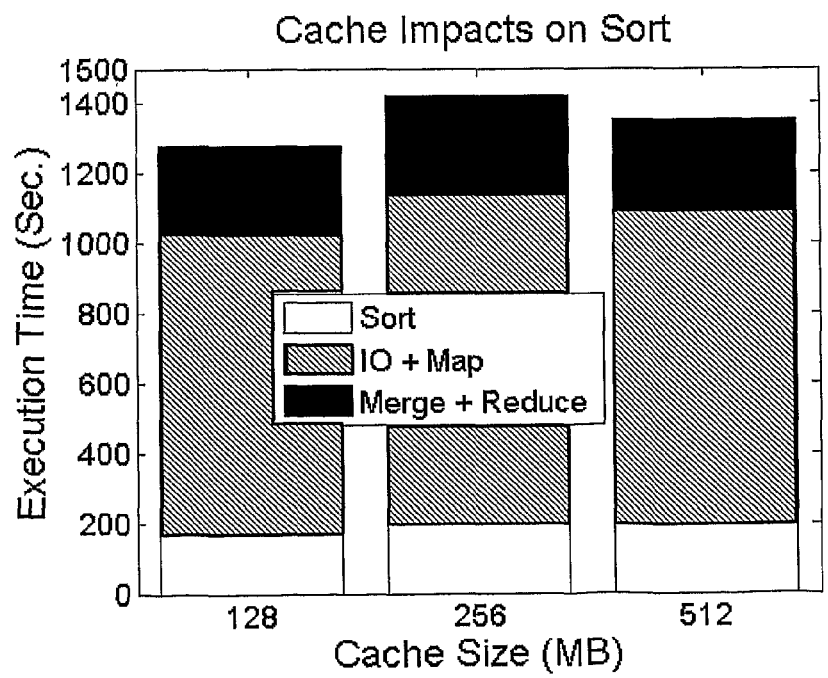

The impact of buffer size on the execution time of applications was evaluated. In particular, the experiments were executed with the different sizes of memory buffer for intermediate results. The results are illustrated in FIGS. 21A and 21B. In the experiments, the size of memory buffer was set to be 128 MB, 256 MB and 512 MB respectively and the results for both applications under each configuration are illustrated.

Different from our expectation, increasing the size of buffer does not have a big effect on the execution time of Word Count and Sort applications. One interesting phenomena is the performance with 256M and 512M buffer is even worse than that with 128M buffer. One reasonable explanation is that a bigger memory buffer can keep more intermediate results, which involves extra overhead during performing quick sort. At the same time, increasing the size of buffer can save the number of IO operations, because the possibility of combining records with same key is increasing. This explains why the performance with 512M buffer is better than with 256M buffer.

Overhead Comparison with Hadoop

Figure 22A:
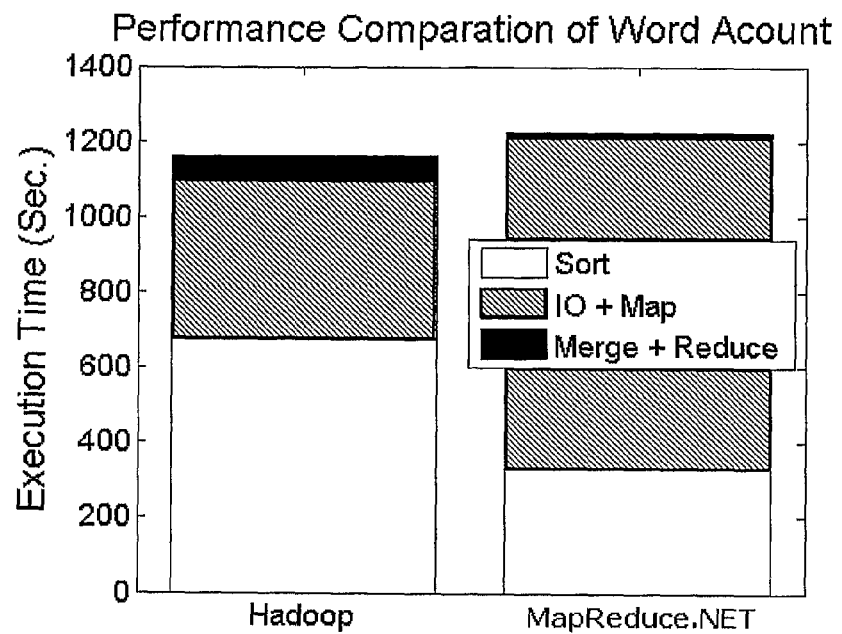
FIGS. 22A and 22B illustrate the results of the experimental overhead comparison of Hadoop and MapReduce.NET of FIG. 16.
Figure 22B:
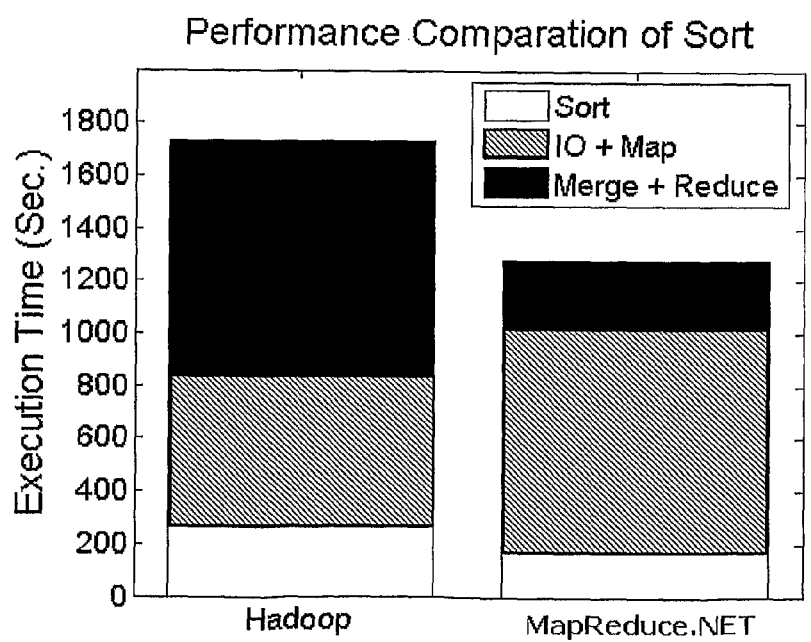

The overhead of MapReduce.NET was compared with Hadoop, the open source MapReduce implementation with Java language. Hadoop is supported by Yahoo (trade mark) and aims to work as a general purposed distributed platform. The stable release of Hadoop, version 0.16.4 was adopted for comparison purposes. To compare the overhead, the local runner of Hadoop and MapReduce.NET respectively were run with same size of input for Word Count and Sort applications. The buffer size was configured to be 128 MB for both implementations. The input for Sort consists of 1,000 million records with 1.48 GB raw data, while for Word Count the size of raw input data is 1 GB. The results are presented in FIGS. 22A and 22B. MapReduce.NET performs worse on the Word Count application than Hadoop, while outperforming Hadoop on the Sort application. Specifically, for Sort application, the sort phase of Hadoop consumes longer time than the MapReduce.NET, while its IO processing is more efficient. Similar phenomenon happens for the Sort application. However, the reduce and merge phases of Hadoop took comparatively longer time than our implementation.

Since Hadoop does not have a parallel version on Windows platform, parallel performance was not compared with Hadoop. Applications were configured as follows:

Word Count: takes the example text files used by Phoenix [51]; the original text files were duplicated to generate an example input with 6 GB raw data, then split into 32 files.

Distributed Sort: sorts 5,000 million records in an ascending order. The key of each record is a random integer. The total raw data is about 7.6 GB, which is partitioned into 32 files.

Figure 23A:
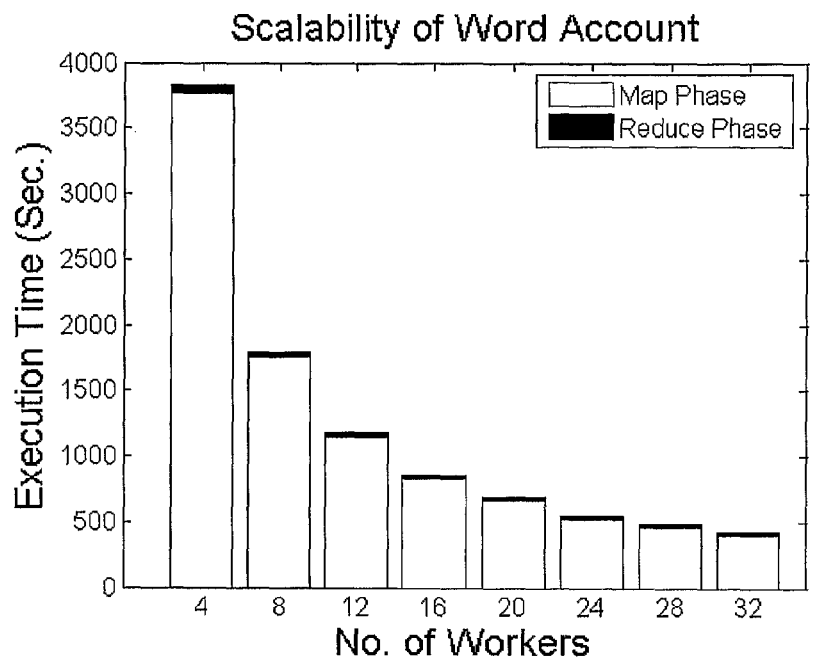
FIGS. 23A and 23B illustrate the results of a scalable experiment of Word Count with MapReduce.NET of FIG. 16.
Figure 23B:
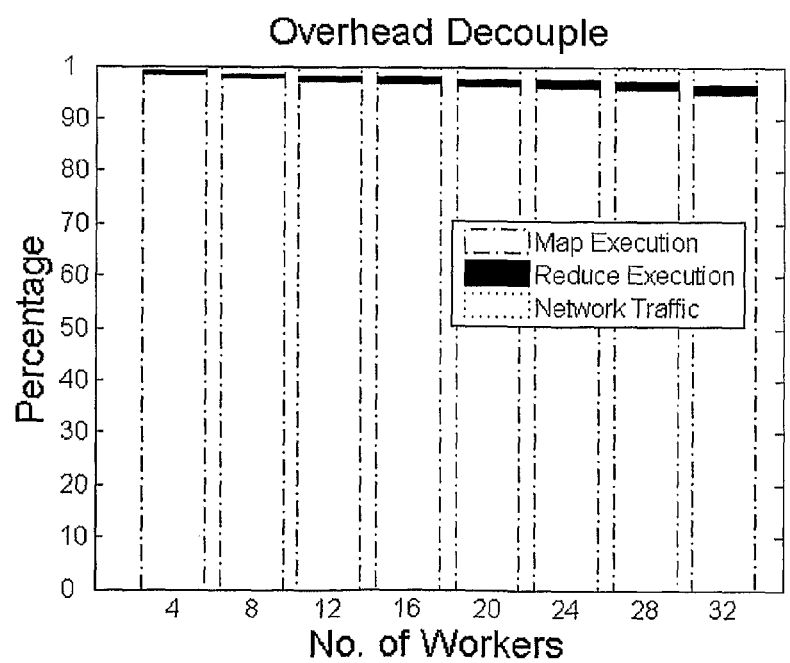

FIGS. 23A and 23B illustrate the scalable performance result of the Word Count application. In these figures, the execution time of Map phase consists of the time from starting execution to the finish of all Map tasks, while the Reduce execution time consists of merge phase plus invoking reduce functions on all the work machines. From the results, we can see map, sort and partition phases dominated the whole execution and the performance increased as more resources were added into the computation.

Figure 24A:
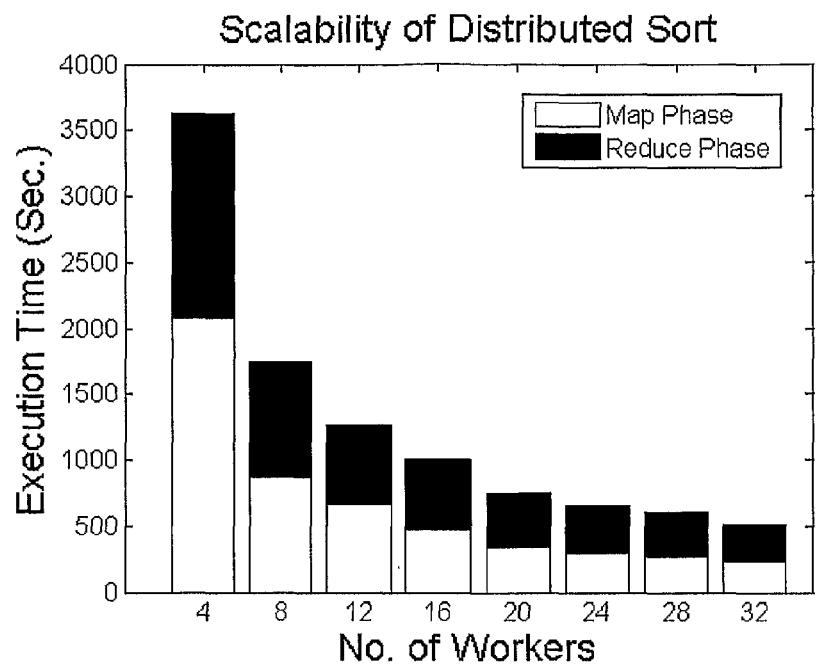
FIGS. 24A and 24B illustrate the results of a scalable experiment of Distributed Sort with MapReduce.NET of FIG. 16.
Figure 24B:
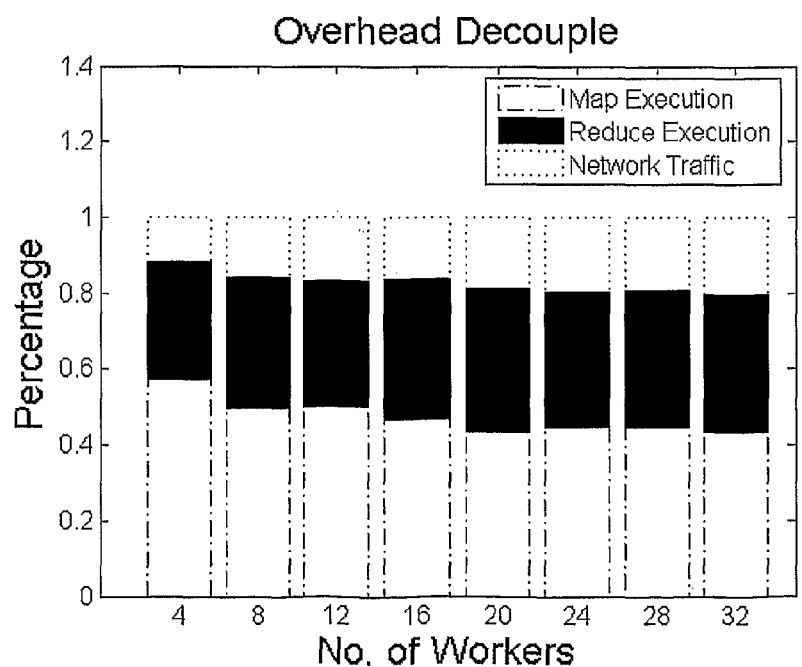

Different from the Word Count application, the Distributed Sort application has a nearly uniform distribution of execution time for Map and Reduce tasks, as illustrated in FIGS. 24A and 24B. However, this does not affect the nearly linearly speedup while adding more resources. The network traffic also takes an important percentage of the whole execution, because the intermediate result of distributed sort is actually same as the original input data.

Based on the experiments of the above two, typical MapReduce applications, MapReduce.NET is shown to provide a scalable performance within homogenous environments during the number of computation machines increases.

iii) Parameter Sweep Programming Model

The platform of FIG. 1 can also support the parameter sweep programming model which can be described as a XML language. The special design XML language for parameter sweep model allows user to define different types of parameters including single, range, random and enum parameters. A user can also specify the shared files, input files and expected output files their application needs, and a collection of commands including execute command, substitute command, delete command, environment command and copy command. By utilizing the parameter sweep model, the Aneka can automatically generate tasks based on XML file and grid enable the existing user applications.

iv) Platform Design Explorer

A design explorer is provided according another embodiment, which allows users who are unfamiliar with the enterprise grid computing platform of FIG. 1 to design their application based on its parameters. The design explorer provides a easy-to-use wizard to create the application template which will be submitted to the platform's client manager, the client manager being responsible for automatically parsing the template and generating numbers of Grid tasks that will be executed within the enterprise grid computing platform of FIG. 1. The design explorer of this embodiment also provides both textual and graphical information about the current status of user submitted tasks. The design explorer enables users to utilize the enterprise grid computing platform of FIG. 1 without writing any line of code. The design explorer is able to help enterprise users scale their applications and increase performance.

Conclusion

The grid computing platform of the embodiment of FIG. 1 provides a service-oriented enterprise grid computing framework, using a container in which services can be added to augment the capabilities of a node. Its flexibility has been demonstrated using two different programming models executed on top of the same enterprise grid. In addition, the threading programming model, and core MPI APIs or the Map Reduce APIs are also supported in the grid computing platform of this embodiment.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in Australia or any other country.

REFERENCES

[1] A. Chien, B. Calder, S. Elbert, K. Bhatia, Entropia: Architecture and Performance of an Enterprise Desktop Grid System, Journal of Parallel and Distributed Computing, Vol. 63, No. 5, Academic Press, USA, May 2003.

[2] D. Anderson, J. Cobb, E. Korpela, M. Lebofsky, D. Werthimer, SETI@home: An Experiment in Public-Resource Computing, Communications of the ACM, Vol. 45 No. 11, ACM Press, USA, November 2002.

[3] S. M. Larson, C. D. Snow, M. R. Shirts, V. S. Pande, Folding@Home and Genome@Home: Using distributed computing to tackle previously intractable problems in computational biology, Computational Genomics, Richard Grant (ed.), Horizon Press, 2002.

[4] M. Litzkow, M. Livny, M. Mutka, Condor—A Hunter of Idle Workstations, Proceedings of the 8th International Conference of Distributed Computing Systems (ICDCS 88), San Jose, Calif., IEEE, CS Press, USA, 1988.

[5] C. Germain, V. Neri, G. Fedak, F. Cappello, XtremWeb: building an experimental platform for Global Computing, Proc. of the 1st IEEE/ACM International Workshop on Grid Computing (Grid 2000), Bangalore, India, December 2000.

[6] A. Luther, R. Buyya, R. Ranjan, S. Venugopal, Alchemi: A .NET-Based Enterprise Grid Computing System, Proceedings of the 6th International Conference on Internet Computing (ICOMP'05), Jun. 27-30, 2005, Las Vegas, USA.

[7] P. Kacsuk, N. Podhorszki, T. Kiss, Scalable desktop Grid system, Proc. of 7th International meeting on high performance computing for computational science (VECPAR 2006), Rio de Janeiro, 2006.

[8] D. P. Anderson, BOINC: A System for Public-Resource Computing and Storage, Proc. of 5th IEEE/ACM International Workshop on Grid Computing, Nov. 8, 2004, Pittsburgh, USA.

[9] F. Cappello, 3rd Generation Desktop Grids, Proc. of 1st XtremWeb Users Group Workshop (XW'07). Hammamet, Tunisia, 2007.

[10] J. Venkat, Grid computing in the enterprise with the UD MetaProcessor, Proceedings of the 2nd International Conference on Peer-to-Peer Computing (P2P 2002), Sep. 5-7, 2002, Linkoping, Sweden.

[11] M. Pollack, Introduction to Spring.NET, Citigroup's FAST (Fast, Agile, Scalable Technology) Lecture Series, New York, USA, Oct. 5, 2006. http://www.springframework.net, (accessed November, 2006).

[12] The Mono Project, An open source, UNIX version of the Microsoft .NET development platform, http://www-.mono-project.com/ (accessed December 2006).

[13] M. Fowler, Inversion of Control Containers and the Dependency Injection pattern, http://www.martinfowler.com/articles/injection.html, (accessed October, 2006).

[14] D. A. Stainforth, M. R. Allen, D. J. Frame, J. A. Kettleborough, C. C. Christensen, T. Aina and M. Collins, climateprediction.net: a global community for research in climate physics, Environmental Online Communication, Springer, London, 2004.

[15] I. Foster, K. Czajkowski, D. Ferguson, J. Frey, S. Graham, T. Maguire, D. Snelling, S. Tuecke, Modeling and Managing State in Distributed Systems: The Role of OGSI and WSRF, Proceedings of the IEEE, volume 93, pages 604-612, March 2005.

[16] J. Gubbi, M. Palaniswami, D. Lai, M. Parker, A Study on the Effect of Using Physico-Chemical Features in Protein Secondary Structure Prediction, Applied Artificial Intelligence, pp. 609-617, World Scientific Press, 2006.

[17] S. F. Altschul, W. Gish, W. Miller, E. W. Myers, and D. J. Lipman, Basic Local Alignment Search Tool, Journal of Molecular Biology, 1990 Oct. 5; 215(3):403-10.

[18] Srikumar Venugopal, Xingchen Chu, and Rajkumar Buyya, A Negotiation Mechanism for Advance Resource Reservation using the Alternate Offers Protocol, Proceedings of the 16th International Workshop on Quality of Service (IWQoS 2008, IEEE Communications Society Press, New York, USA), 2-4 Jun. 2008, Twente, The Netherlands.

[19] Chao Jin and Rajkumar Buyya, MapReduce Programming Model for .NET-based Distributed Computing, Technical Report, GRIDS-TR-2008-15, Grid Computing and Distributed Systems Laboratory, The University of Melbourne, Australia, 17 Oct. 2008.

[20] I. Foster and C. Kesselman, The Grid: Blueprint for a Future Computing Infrastructure. San Francisco, USA: Morgan Kaufmann Publishers, 1999.

[21] R. J. Al-Ali, K. Amin, G. von Laszewski, O. F. Rana, D. W. Walker, M. Hategan, and N. Zaluzec, "Analysis and provision of qos for distributed grid applications," Journal of Grid Computing, vol. 2, no. 2, pp. 163-182, June 2004.

[22] D. Ouelhadj, J. Garibaldi, J. MacLaren, R. Sakellariou, and K. Krishnakumar, "A multi-agent infrastructure and a service level agreement negotiation protocol for robust scheduling in grid computing." in Proceedings of the 2005 European Grid Computing Conference (EGC 2005), 2005, pp. 651-660.

[23] C. L. Dumitrescu and I. Foster, "Gruber: A grid resource usage sla broker," in Proceedings of the 11th International Euro-Par Conference on Parallel Processing, Lisbon, Portugal, ser. LNCS, no. 3648. Springer-Verlag, Berlin, Germany, August 2005.

[24] E. Elmroth and J. Tordsson, "A grid resource broker supporting advance reservations and benchmark-based resource selection." in State-of-the-art in Scientific Computing, ser. LNCS. Springer-Verlag, Berlin, Germany, 2006, vol. 3732, pp. 1061-1070.

[25] K. Czajkowski, I. Foster, C. Kesselman, V. Sander, and S. Tuecke, "SNAP: A protocol for negotiating service level agreements and coordinating resource management in distributed systems," in Proceedings of the 8th International Workshop on Job Scheduling Strategies for Parallel Processing (JSSPP 2002), Edinburgh, Scotland. Springer-Verlag, Berlin, Germany, 2002, pp. 153-183.

[26] R. Ranjan, A. Harwood, and R. Buyya, "Sla-based coordinated superscheduling scheme for computational grids," in Proceedings of the 8th IEEE International Conference on Cluster Computing (Cluster 2006), Barcelona, Spain. IEEE CS Press, Los Alamitos, Calif., USA, 2006.

[27] A. Andrieux et al., "Web services agreement specification (wsagreement)," Open Grid Forum, Tech. Rep. GFD. 107, 2007.

[28] R. Smith, "The Contract Net Protocol: High-Level Communication and Control in a Distributed Problem Solver," IEEE Transactions on Computers, vol. C-29, no. 12, pp. 1104-1113, 1980.

[29] A. Rubinstein, "Perfect equilibrium in a bargaining model," Econometrica, vol. 50, no. 1, pp. 97-109, January 1982.

[30] S. Venugopal, R. Buyya, and L. Winton, "A grid service broker for scheduling e-science applications on global data grids," Concurrency and Computation: Practice and Experience, vol. 18, no. 6, pp. 685-699, May 2006.

[31] X. Chu, K. Nadiminti, C. Jin, S. Venugopal, and R. Buyya, "Aneka: Next-Generation Enterprise Grid Platform for e-Science and e-Business Applications," in Proceedings of the 3rd IEEE International Conference on e-Science and Grid Computing (e-Science 2007), Bangalore, India. IEEE CS Press, Los Alamitos, Calif., USA., December 2007.

[32] T. Abdelzaher, E. Atkins, and K. Shin, "Qos negotiation in real-time systems and its application to automated flight control," Transactions on Computers, vol. 49, no. 11, pp. 1170-1183, 2000.

[33] J. Huang, P.-J. Wan, and D.-Z. Du, "Criticality- and QoS-based multiresource negotiation and adaptation," Real-Time Systems, vol. 15, no. 3, pp. 249-273, November 1998.

[34] M. J. Buco, R. N. Chang, L. Z. Luan, C. Ward, J. L. Wolf, and P. S. Yu, "Utility computing SLA management based upon business objectives," IBM System Journal, vol. 43, no. 1, pp. 159-178, 2004.

[35] J. Li and R. Yahyapour, "Learning-based negotiation strategies for grid scheduling," in Proceedings of the 6th IEEE International Symposium on Cluster Computing and the Grid (CCGrid 2006), Singapore. IEEE CS Press, Los Alamitos, Calif., USA, May 2006.

[36] I. Foster, C. Kesselman, C. Lee, B. Lindell, K. Nahrstedt, and A. Roy, "A distributed resource management architecture that supports advance reservations and co-allocation," in Proceedings of the 7th International Workshop on Quality of Service (IWQoS '99). London, UK: IEEE CS Press, Los Alamitos, Calif., USA, March 1999.

[37] I. Foster, A. Roy, and V. Sander, "A quality of service architecture that combines resource reservation and application adaptation," in Proceedings of Eight International Workshop on Quality of Service (IWQoS 2000), Pittsburgh, Pa., USA. IEEE CS Press, Los Alamitos, Calif., USA, June 2000, pp. 181-188.

[38] Y. Fu, J. Chase, B. Chun, S. Schwab, and A. Vandat, "Sharp: an architecture for secure resource peering," SIGOPS Oper. Syst. Rev., vol. 37, no. 5, pp. 133-148, 2003.

[39] S. Kraus, J. Wilkenfeld, and G. Zlotkin, "Multiagent negotiation under time constraints," Artificial Intelligence, vol. 75, no. 2, pp. 297-345, 1995.

[40] J. Rosenschein and G. Zlotkin, Rules of encounter: designing conventions for automated negotiation among computers. MIT Press Cambridge, Mass., USA, 1994.

[41] D. E. Irwin, L. E. Grit, and J. S. Chase, "Balancing Risk and Reward in a Market-based Task Service," in Proceedings of the 13th IEEE international Symposium on High Performance Distributed Computing (HPDC-13). Honolulu, USA: IEEE CS Press, Los Alamitos, Calif., USA, June 2004.

[42] S. Venugopal and R. Buyya, "A Deadline and Budget Constrained Scheduling Algorithm for e-Science Applications on Data Grids," in Proceedings of the 6th International Conference on Algorithms and Architectures for Parallel Processing (ICA3PP-2005), ser. Lecture Notes in Computer Science, vol. 3719. Melbourne, Australia.: Springer-Verlag, Berlin, Germany, October 2005.

[43] P. Leah, M. Mealling, and R. Salz, "A Universally Unique IDentifier (UUID) URN Namespace," IETF RFC, July 2005.

[44] M. A. Netto, K. Bubendorfer, and R. Buyya, "SLA-based Advance Reservations with Flexible and Adaptive Time QoS Parameters," in Proceedings of the 5th International Conference on Service-Oriented Computing (ICSOC 2007), Vienna, Austria. Springer-Verlag, Berlin, Germany, September 2007.

[45] J. Li and R. Yahyapour, "A negotiation model supporting coallocation for grid scheduling," in Proc. of 7th IEEE/ACM International Conference on Grid Computing (Grid 2006), Barcelona, Spain. IEEE CS Press, Los Alamitos, Calif., USA, September 2006.

[46] A. Mu'alem and D. Feitelson, "Utilization, predictability, workloads, and user runtime estimates in scheduling the ibm sp2 with backfilling," IEEE Transactions on Parallel and Distributed Systems, vol. 12, no. 6, pp. 529-543, 2001.

[47] J. Broberg, S. Venugopal, and R. Buyya, "Market-oriented Grids and Utility Computing: The State-of-the-art and Future Directions," Journal of Grid Computing. [Online] Available: http://dx.doi.org/10.1007/s10723-007-9095-3.

[48] Apache. Hadoop. http://lucene.apache.org/hadoop/.

[49] A. W. McNabb, C. K. Monson, and K. D. Seppi, Parallel PSO Using MapReduce, In Proceedings of the Congress on Evolutionary Computation (CEC 2007), Singapore, 2007.

[50] A. Weiss. Computing in the Clouds. netWorker, 11(4): 16-25, Dec. 2007.

[51] C. Ranger, R. Raghuraman, A. Penmetsa, G. Bradski, C. Kozyrakis, Evaluating MapReduce for Multi-core and Multiprocessor Systems, Proceedings of the 13th Intl. Symposium on High-Performance Computer Architecture (HPCA), Phoenix, Ariz., February 2007.

[52] D. A. Patterson, Technical perspective: the data center is the computer, Communications of the ACM, 51-1, 105, January 2008.

[53] D. Gregor and A. Lumsdaine, Design and Implementation of a High-Performance MPI for C# and the Common Language Infrastructure, Principles and Practice of Parallel Programming, pp. 133-142, February 2008, ACM.

[54] H. Sutter, J. Larus, Software and the Concurrency Revolution, ACM Queue, Vol. 3, No. 7, pp 54-62, 2005.

[55] H. C. Yang, A. Dasdan, R. L. Hsiao, and D. S. P. Jr. Map-reduce-merge: simplified relational data processing on large clusters, Proceedings of SIGMOD, 2007.

[56] J. Dean and S. Ghemawat, MapReduce: Simplified Data Processing on Large Clusters, Proceedings of the 6th Symposium on Operating System Design and Implementation (OSDI), San Francisco, Calif., December, 2004.

[57] J. Markoff and S. Hansell. Hiding in plain sight, Google seeks more power, New York Times, Jun. 14, 2006.

[58] M. Isard, M. Budiu, Y. Yu, A. Birrell, and D. Fetterly, Dryad: Distributed Data-Parallel Programs from Sequential Building Blocks, European Conference on Computer Systems (EuroSys), Lisbon, Portugal, March, 2007.

[59] M. Kruijf and K. Sankaralingam. MapReduce for the Cell B. E. Architecture, TR1625, Technical Report, Department of Computer Sciences, The University of Wisconsin-Madison, 2007.

[60] R. Buyya, C. S. Yeo, and S. Venugopal, Market-Oriented Cloud Computing: Vision, Hype, and Reality for Delivering IT Services as Computing Utilities, Proceedings of the 10th IEEE International Conference on High Performance Computing and Communications (HPCC 2008), September, 2008, Dalian, China.

[61] R. E. Bryant, Data-Intensive Supercomputing: The Case for DISC, CMU-CS-07-128, Technical Report, Department of Computer Science, Carnegie Mellon University, May, 2007.

[62] S. Chen, S. W. Schlosser. Map-Reduce Meets Wider Varieties of Applications, IRP-TR-08-05, Technical Report, Intel Research Pittsburgh, May, 2008.

[63] T. H. Cormen, C. E. Leiserson, R. L. Rivest, C. Stein, Introduction to Algorithms, Second Edition, The MIT Press, Massachusetts, USA.

[64] T. Hey and A. Trefethen. The data deluge: an e-Science perspective. In F. Berman, G. C. Fix, and A. J. G. Hey, editors, Grid Computing: Making the Global Infrastructure a Reality, pp. 809-824. Wiley, 2003.

[65] X. Chu, K. Nadiminti, J. Chao, S. Venugopal, and R. Buyya, Aneka: Next-Generation Enterprise Grid Platform for e-Science and e-Business Applications, Proceedings of the 3rd IEEE International Conference and Grid Computing, Bangalore, India, 10-13 Dec. 2007.

[66] R. Buyya, C. S. Yeo, and S. Venugopal, Market-Oriented Cloud Computing: Vision, Hype, and Reality for Delivering IT Services as Computing Utilities, Proceedings of the 10th IEEE International Conference on High Performance Computing and Communications, 25-27 Sep. 2008, Dalian, China.

The invention claimed is:

1. A system for providing grid computing on a network of computing nodes in mutual data communication, said system comprising:

a configurable service container executable at said nodes, said service container comprising message dispatching, communication, network membership, and persistence modules, wherein said service container hosts pluggable service modules, wherein when executed at said nodes, at least one instance of said service container includes a membership service module for maintaining network connectivity between said nodes, wherein at least one instance of said service container includes a scheduler service module that receives one or more tasks from a client based on an index node and schedules said tasks on at least one of said nodes, and wherein at least one instance of said service container includes an executor service module that receives one or more tasks from said scheduler service module, and executes said tasks that are received, and returns at least one result to said scheduler service module; and a computing device that creates multiple parallel programming models based on said result for execution by a computer program run on said network, wherein computerized applications that are constructed using different parallel programming models are simultaneously executable over said network.

2. The system as claimed in claim 1, wherein said service modules support a selected programming model.

3. The system as claimed in claim 1, wherein said service modules support a plurality of programming models.

4. The system as claimed in claim 1, wherein a plurality of said computing nodes are executed on respective processor cores of a single processor.

5. The system as claimed in claim 1, wherein said service container includes configurable security and logging modules.

6. The system as claimed in claim 1, wherein at least one instance of said service container includes more than one of said membership service module, said scheduler service module, and said executor service module.

7. The system as claimed in claim 1, wherein when executed at said nodes, a plurality of instances of said service container includes an executor module that executes tasks.

8. The system as claimed in claim 1, wherein each node comprises a computing device, and wherein a single computing device comprises multiple nodes when the computing device has multiple processors or multiple processor cores.

9. The system as claimed in claim 1, wherein services provided by said modules and said service container are mutually independent.

10. The system as claimed in claim 1, further comprising an allocation manager service that checks an availability of a computation resource on said nodes in response to a negotiation for said computation resource, and reserves said computation resource when said negotiation succeeds.

11. The system as claimed in claim 10, wherein said negotiation is conducted using a negotiation web service.

12. The system as claimed in claim 1, further comprising a MapReduce programming model.

13. The system as claimed in claim 12, wherein said MapReduce programming model is adapted for a .NET platform.

14. A computing system comprising a grid of computing nodes in mutual data communication, each of said nodes comprising:
   a configurable service container executed at a respective node, said service container comprising message dispatching, communication, network membership, and persistence modules, wherein said service container hosts pluggable service modules, wherein at least one of the service containers includes a membership service module that maintains network connectivity between said nodes, wherein at least one of said service containers includes a scheduler service module that receives one or more tasks from a client and schedules said tasks on at least one of said nodes, and wherein at least one of said service containers includes an executor service module that receives one or more tasks from said scheduler service module, executes said tasks that are received, and returns at least one result to said scheduler service module; and
   a computing device that creates multiple parallel programming models based on said result for execution by a computer program run on a network, wherein computerized applications that are constructed using different parallel programming models are simultaneously executable over said network.

15. The computing system as claimed in claim 14, wherein said service modules support a selected programming model.

16. The computing system as claimed in claim 14, wherein said service modules support a plurality of programming models.

17. The computing system as claimed in claim 14, wherein a plurality of said computing nodes are executed on respective processor cores of a single processor.

18. The computing system as claimed in claim 14, wherein said service container includes configurable security and logging modules.

19. The computing system as claimed in claim 14, wherein at least one instance of said service container includes more than one of said membership service module, said scheduler service module, and said executor service module.

20. The computing system as claimed in claim 14, wherein when executed at said nodes, a plurality of instances of said service container includes an executor module that executes tasks.

21. The computing system as claimed in claim 14, wherein each node comprises a computing device, and wherein a single computing device comprises multiple nodes when the computing device has multiple processors or multiple processor cores.

22. The computing system as claimed in claim 14, wherein services provided by said modules and said service container are mutually independent.

23. A grid computing method for providing grid computing on a network of computing nodes in mutual data communication, said method comprising:
   executing a configurable service container at said nodes, said service container comprising message dispatching, communication, network membership, and persistence modules, wherein said service container hosts pluggable service modules;
   maintaining network connectivity between said nodes with a membership service module of at least one instance of said service container;
   receiving one or more tasks from a client;
   scheduling said tasks on at least one of said nodes with a scheduler service module of at least one instance of said service container;
   receiving one or more tasks from said scheduler service module;
   executing said tasks that are received; and
   returning at least one result to said scheduler service module with an executor service module of at least one instance of said service container.

24. The method as claimed in claim 23, further comprising adapting said service modules to support a selected programming model, and executing said selected programming model.

25. The method as claimed in claim 23, further comprising adapting said service modules to support a plurality of programming models, and executing said programming models.

26. The method as claimed in claim 23, further comprising adapting said service modules to support at least one parallel programming model and at least one distributed programming model.

27. The method as claimed in claim 23, wherein a plurality of said computing nodes comprise respective processor cores of a single processor.

28. The method as claimed in claim 23, further comprising:
   checking an availability of a computation resource on said nodes with an allocation manager service in response to a negotiation for said computation resource; and
   reserving said computation resource with said allocation manager service when said negotiation succeeds.

29. The method as claimed in claim 28, further comprising conducting said negotiation using a negotiation web service.

30. The method as claimed in claim 23, further comprising providing a MapReduce programming model.

31. The method as claimed in claim 30, wherein said MapReduce programming model is adapted for a .NET platform.

32. A grid computing method for performing grid computing on a network of computing nodes in mutual data communication, said method comprising:

executing on each of said nodes a configurable service container executed at a respective node, said service container comprising message dispatching, communication, network membership, and persistence modules, wherein said service container hosts pluggable service modules, wherein at least one of the service containers includes a membership service module that maintains network connectivity between said nodes, wherein at least one of said service containers includes a scheduler service module that receives one or more tasks from a client, and schedules said tasks on at least one of said nodes, and wherein at least one of said service containers includes an executor service module that receives one or more tasks from said scheduler service module, executes said tasks that are received, and returns at least one result to said scheduler service module.

* * * * *